(12) United States Patent
Opel

(10) Patent No.: US 6,527,598 B1
(45) Date of Patent: Mar. 4, 2003

(54) ELECTRICAL WIRING SYSTEM

(76) Inventor: George E. Opel, 205 Ridings Way, Ambler, PA (US) 19002

( * ) Notice: Subject to any disclaimer, the term of this patent is extended or adjusted under 35 U.S.C. 154(b) by 0 days.

(21) Appl. No.: 09/964,027

(22) Filed: Sep. 26, 2001

(51) Int. Cl.[7] ................................................ H01R 9/22
(52) U.S. Cl. ....................................................... 439/709
(58) Field of Search ................................ 439/709, 781, 439/791, 794, 810, 814

(56) References Cited

U.S. PATENT DOCUMENTS 2,882,513 A * 4/1959 Olashaw ..................... 439/198
5,471,012 A 11/1995 Opel

OTHER PUBLICATIONS

Reader's Digest New Complete Do–It–Yourself Manual, 1999, pp. 238–241 and 252–253.

* cited by examiner

Primary Examiner—P. Austin Bradley
Assistant Examiner—Phuong Nguyen
(74) Attorney, Agent, or Firm—Paul & Paul

(57) ABSTRACT

An electrical wiring system for use in junction boxes, switch boxes, outlet boxes and the like is disclosed. The wiring system includes an array of busses and or fasteners that allow wires from an electrical fixture such as a light, switch, receptacle, fan, etc., to be connected to the various conductors of a building's wiring in an organized, safe, and convenient manner.

19 Claims, 30 Drawing Sheets

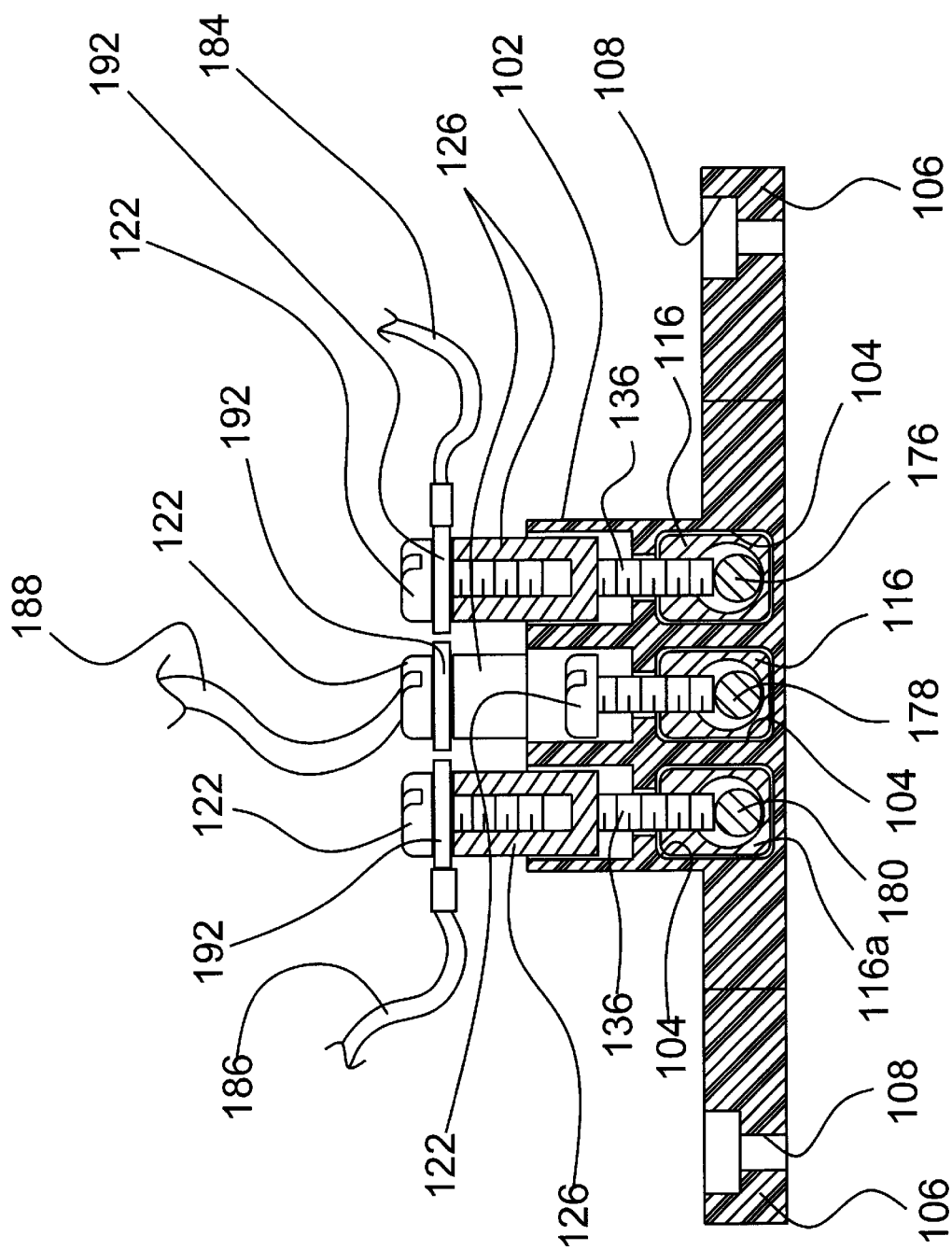

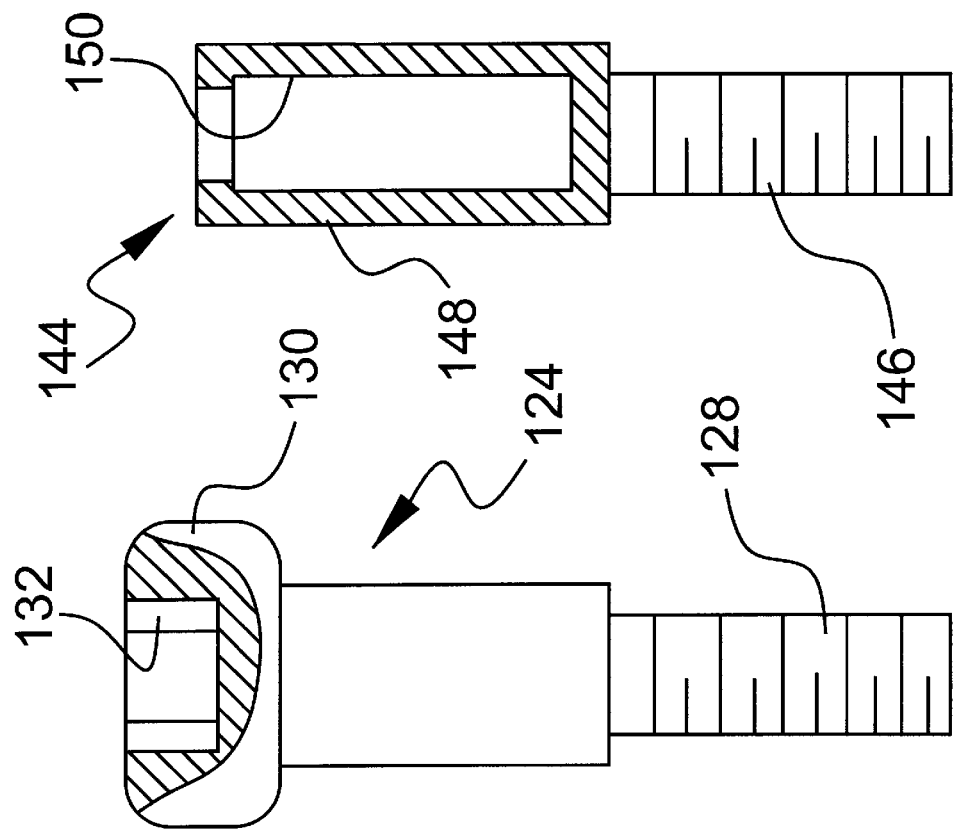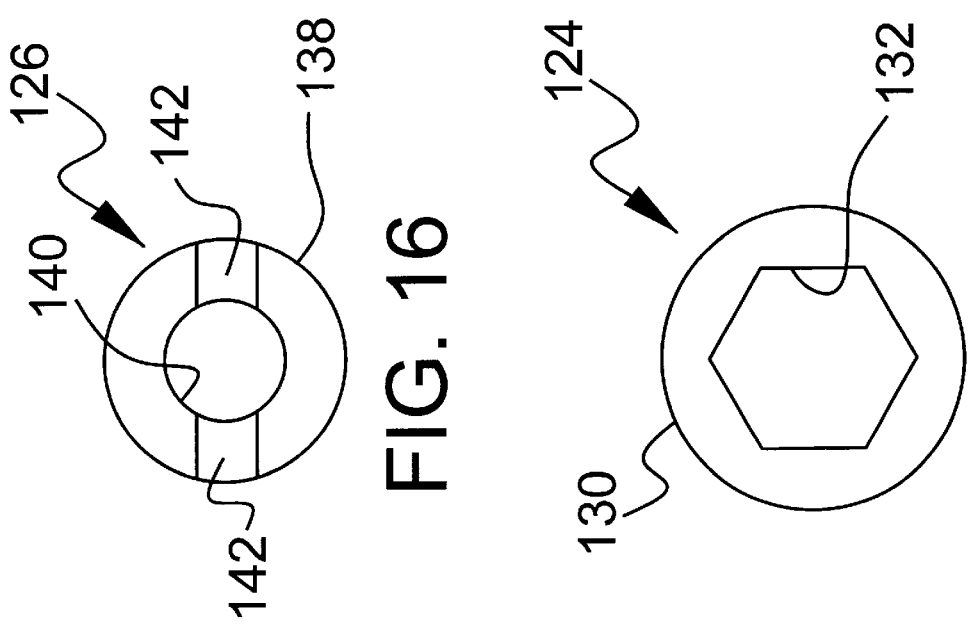

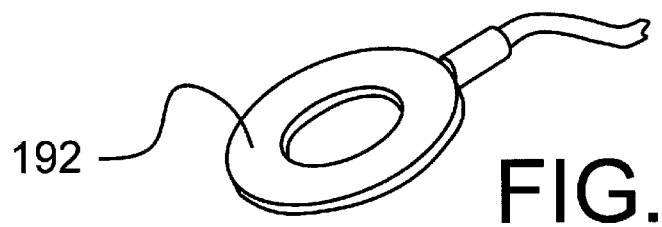
FIG. 23A
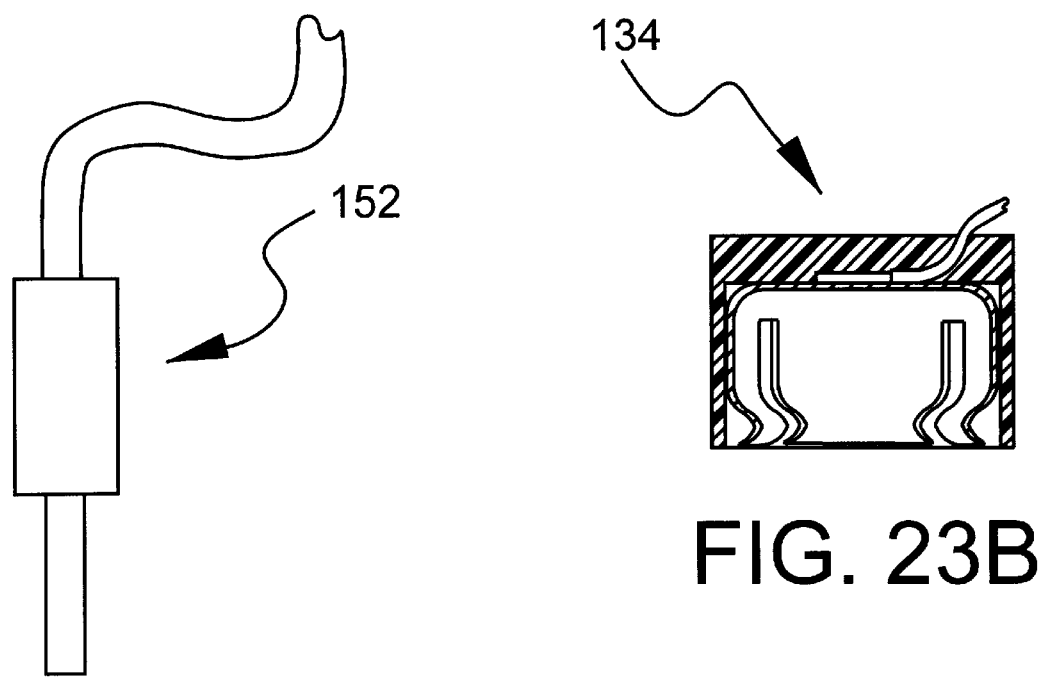
FIG. 23B
FIG. 23C

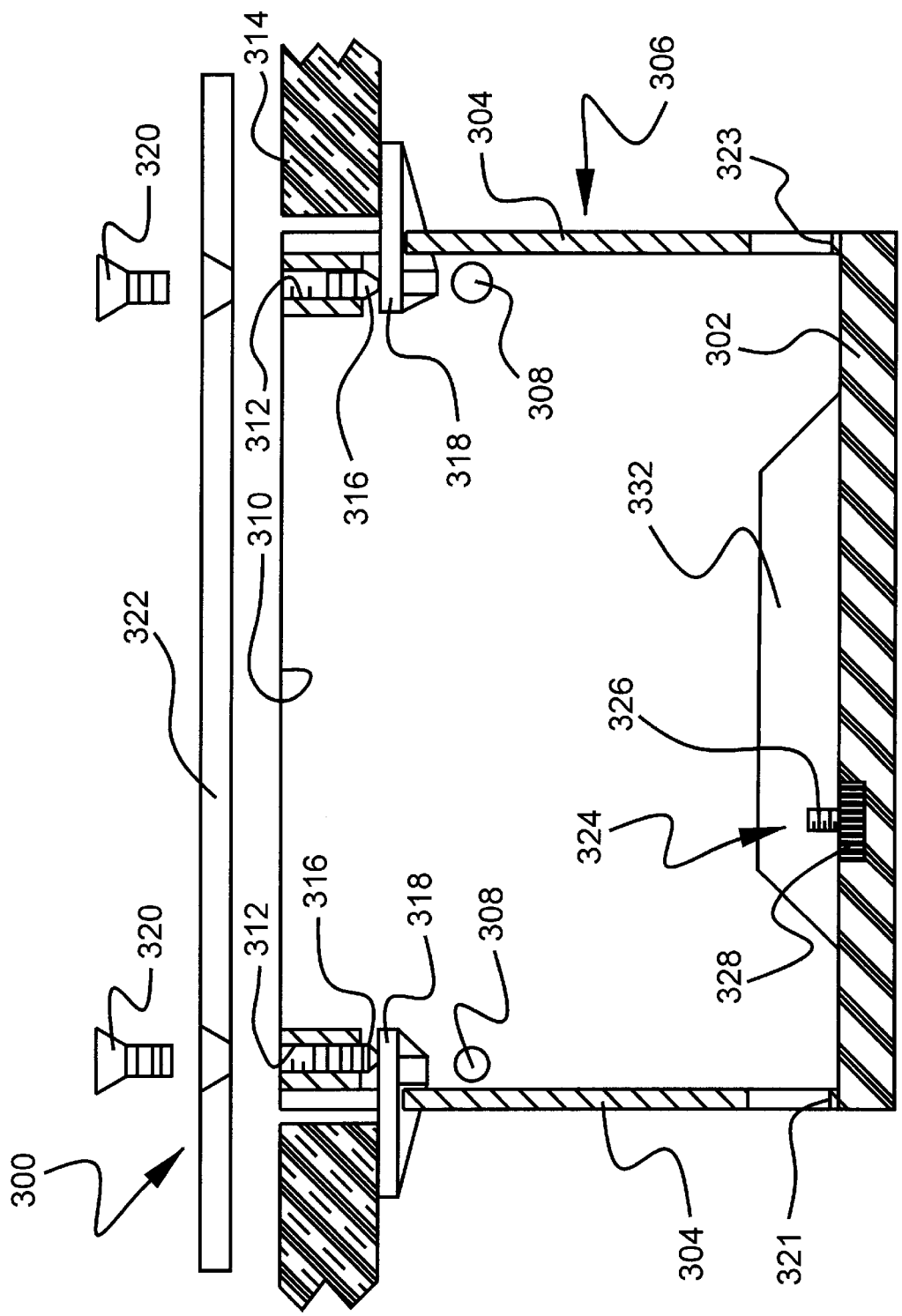

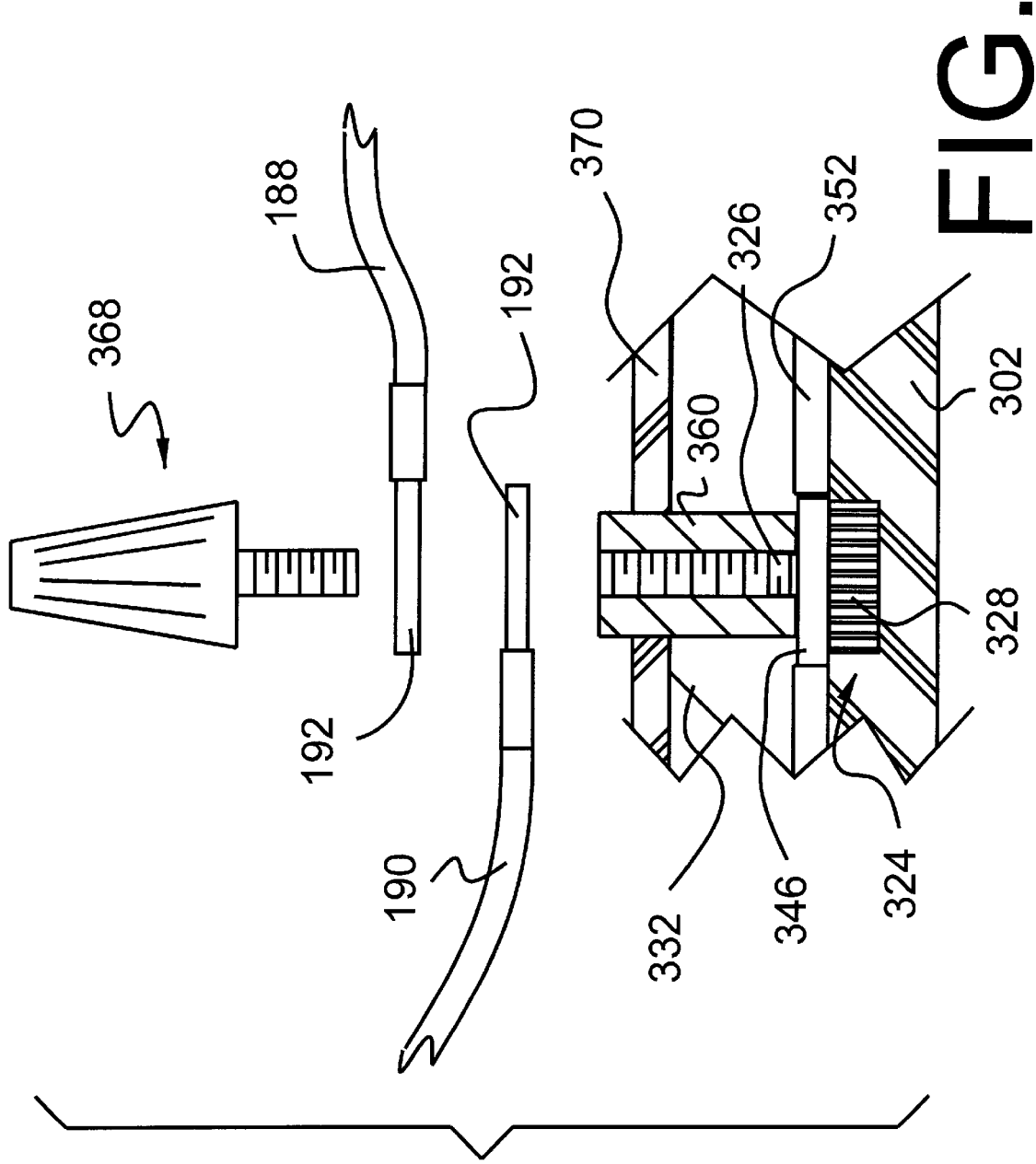

ELECTRICAL WIRING SYSTEM

BACKGROUND OF THE INVENTION

1. Field of Invention

This invention relates generally to an electrical wiring system for use in junction boxes, switch boxes, outlet boxes, and the like.

2. Brief Description of the Related Art

In residential wiring systems it is often necessary to interconnect several electrical fixtures to each other and to a source of electrical power. Examples of such electrical fixtures include lighting fixtures, switches, and electrical outlets or sockets. The source of electrical power is normally a power supply cable carrying electricity at a voltage appropriate for residential applications. Such power supply cables carry the current from a step-down transformer and distribute the current throughout a building. Connections between the several electrical fixtures and the source of electrical power have heretofore been accomplished using short pieces of wire known as pigtails 40 and frustoconical connectors 42 that screw on to bare ends of wires to splice the wires together (see FIG. 1). The resulting tangle of pigtails and connectors is then packed into a junction box, switch box, or the like, which are collectively referred to herein as junction boxes. The connectors used in such applications are limited in the number of wires that they can gang together, and multiple pigtails and connectors are required to gang together more than three or four wires. The tangle of wires that usually results from the use of pigtails and connectors makes it very difficult for the electrician to keep track of where or what each wire is connected to and can lead to improperly connected wires that in turn can create a hazardous condition. The need persists in the art for a wiring system for a junction box that provides greater flexibility, versatility, ease of installation and use, safety, and reliability.

SUMMARY OF THE INVENTION

The present invention is directed to a junction box that provides a simple and orderly way in which to connect wires together, either in pairs or in multi-gang hook-ups, that avoids the confusing tangle created by the use of pigtails and the traditional connectors. The present invention includes an array of fasteners and/or buss bars that can connect together ends of wires in an organized and orderly manner. The arrays may be adapted for installation inside a junction box or the arrays may be integral with the inner surfaces of the junction box.

BRIEF DESCRIPTION OF THE DRAWINGS

FIG. 15 is a cross sectional view, taken transversely to the longitudinal passages through the insulating block, showing the buss bars positioned within the insulating block of the first embodiment of the electrical interconnection system according to the present invention together with connections to other circuit components.

FIG. 16 is a top plan view showing the screwdriver slot of a first embodiment of a type 2 fastener [ ] for use with the first embodiment of the electrical interconnection system according to the present invention.

FIGS. 17 and 18 are views of a second embodiment of a type 2 fastener for use with the first embodiment of the electrical interconnection system according to the present invention.

FIG. 19 is a partial cross sectional view of a third embodiment of a type 2 fastener for use with the first embodiment of the electrical interconnection system according to the present invention.

3

Figure 22A:
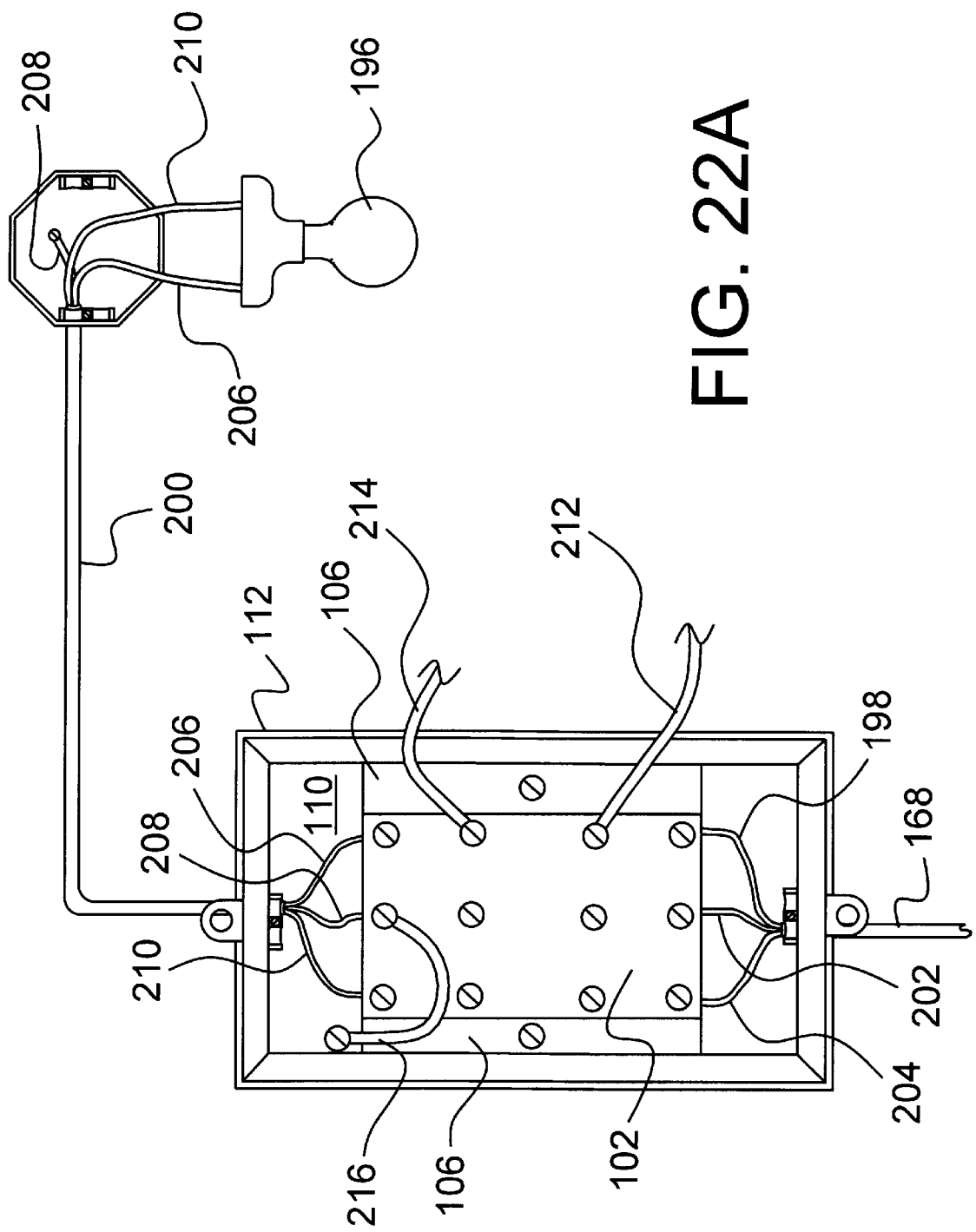
Figure 22B:
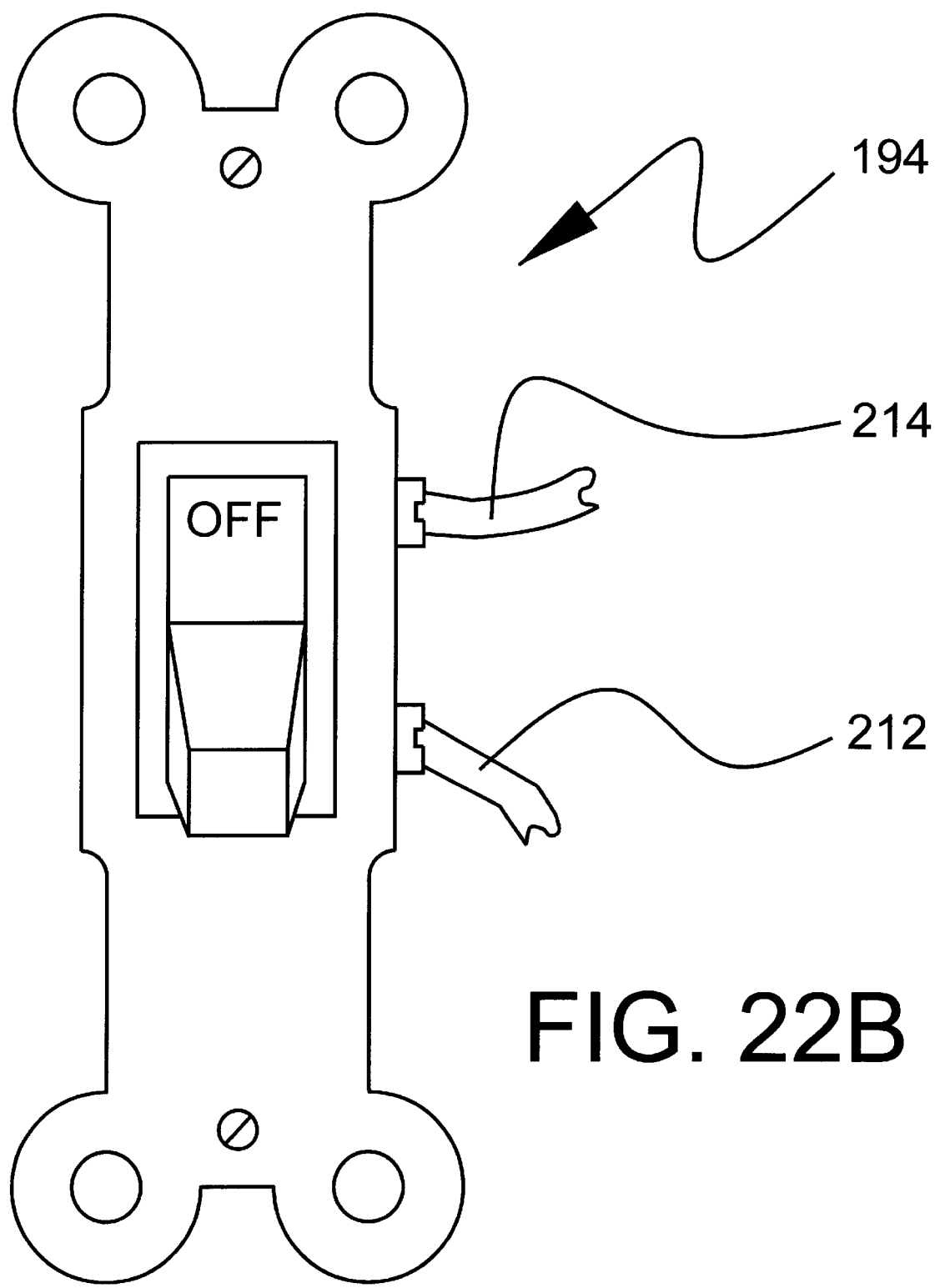

FIGS. 22A and 22B are views showing the first embodiment of an electrical interconnection system according to the present invention applied to a switch.

FIGS. 23A–23C are views showing various terminal connectors for use with the first embodiment of the electrical interconnection system according to the present invention.

FIG. 24 is a cross sectional view of the second embodiment of an electrical interconnection system according to the present invention.

Figure 25:
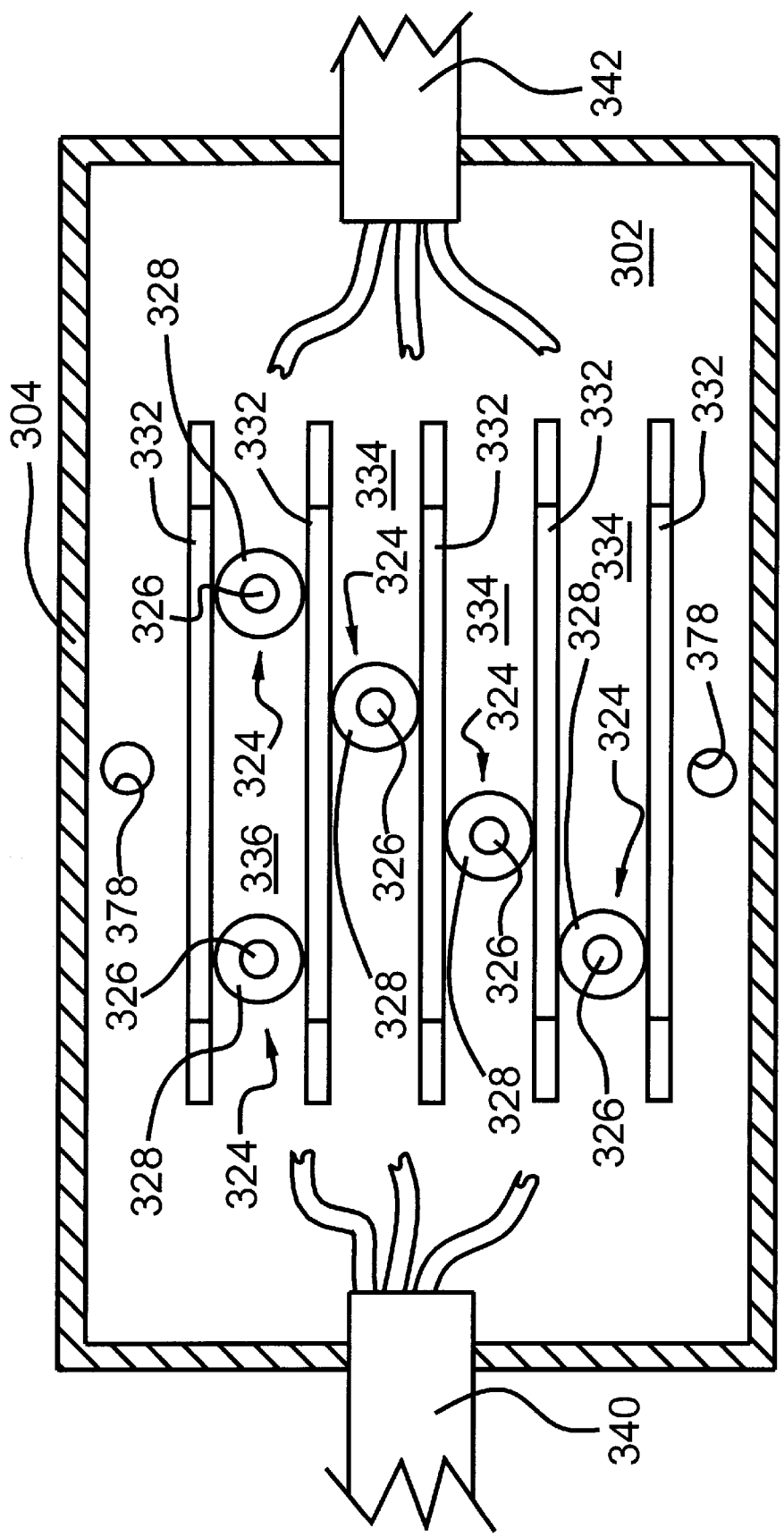

FIG. 25 is a plan view of a second embodiment of an electrical interconnection system according to the present invention.

Figure 26:
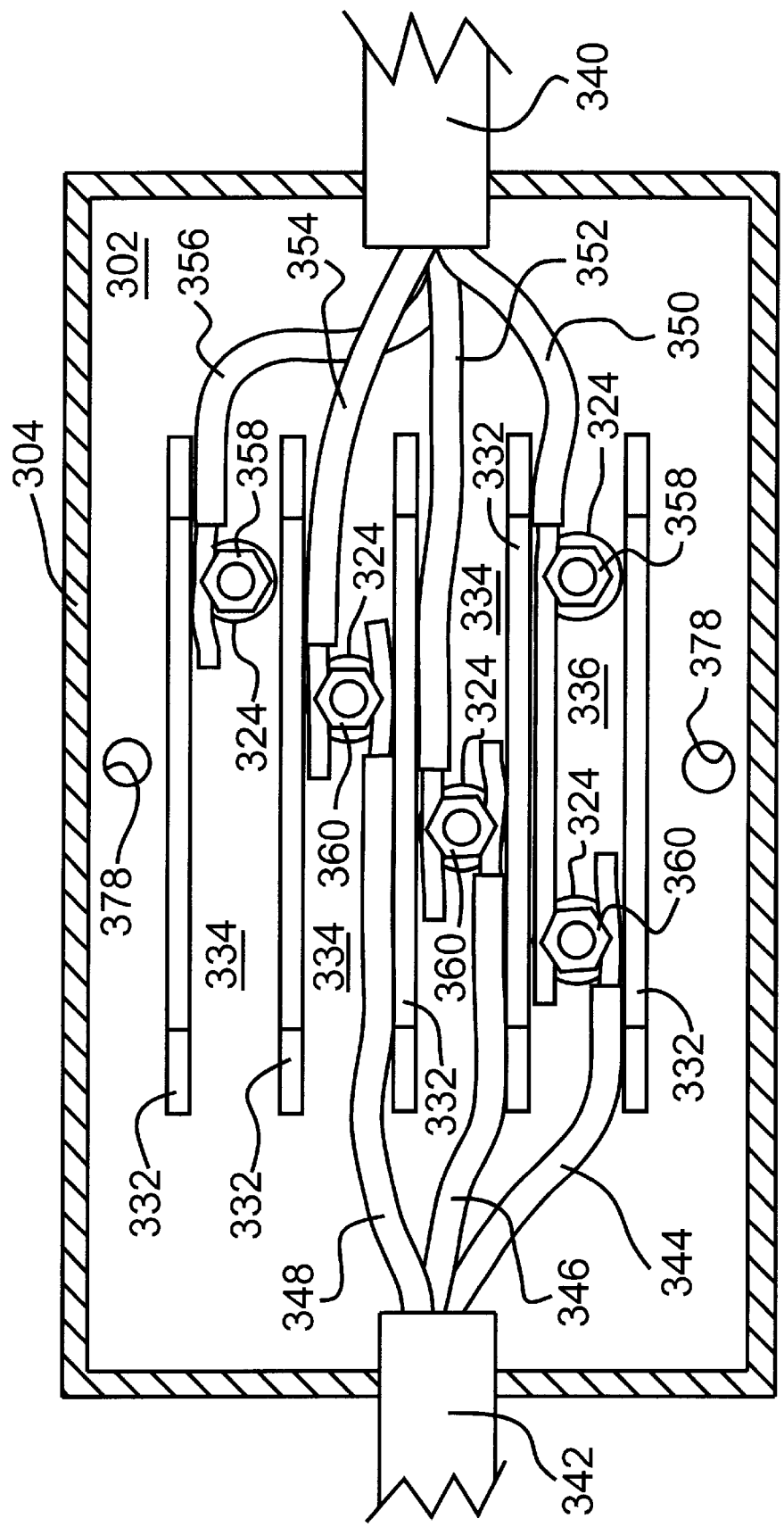

FIG. 26 is a plan view of a second embodiment of an electrical interconnection system according to the present invention showing wires connected to the electrical interconnection system in a configuration suitable for use with a receptacle.

Figure 27:
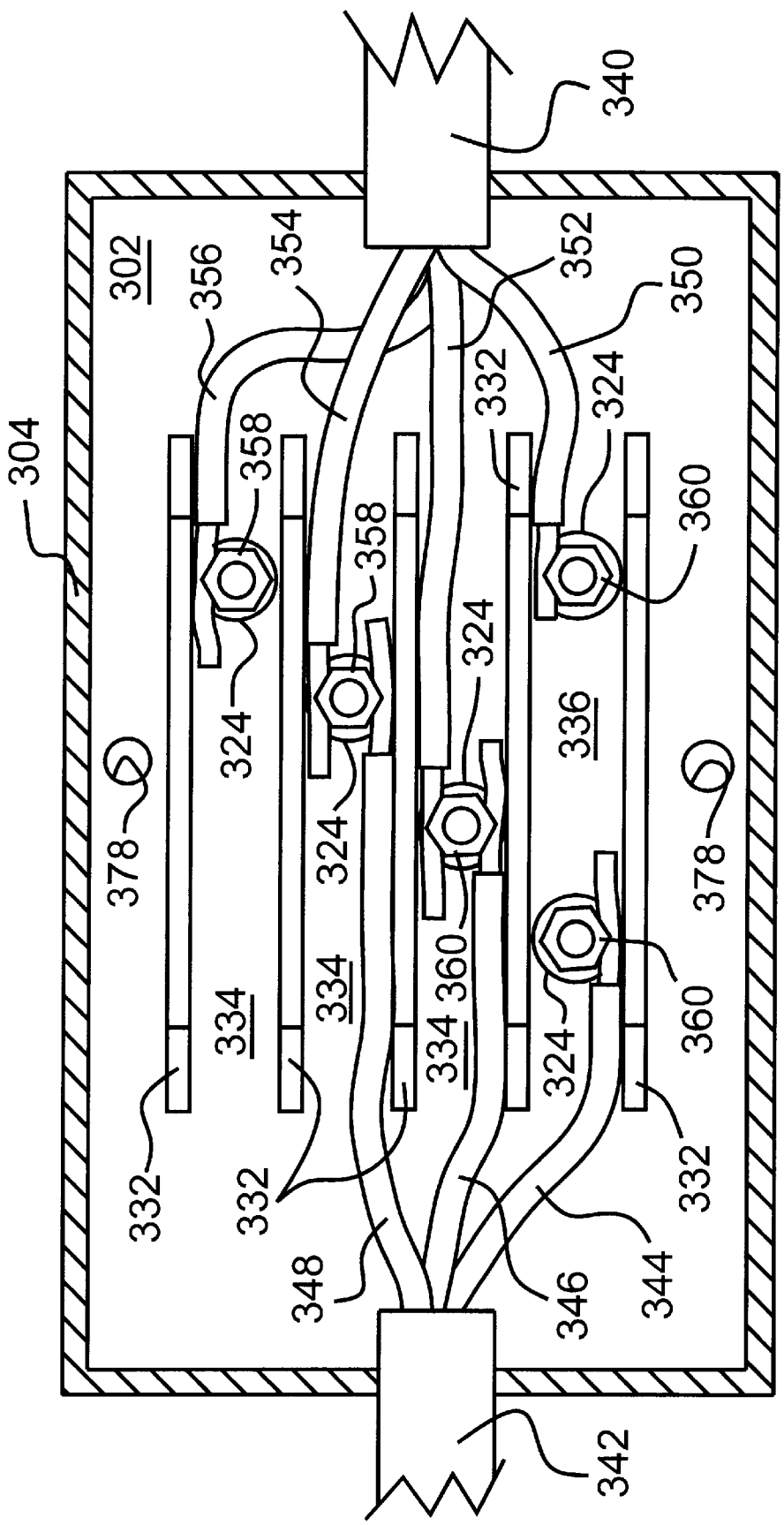

FIG. 27 is a plan view of a second embodiment of an electrical interconnection system according to the present invention showing wires connected to the electrical interconnection system in a configuration suitable for use with a switch.

Figure 28A:
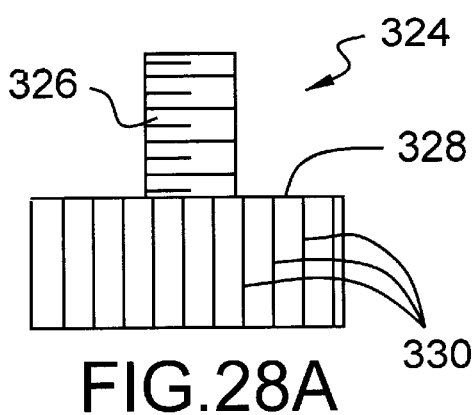
Figure 28B:
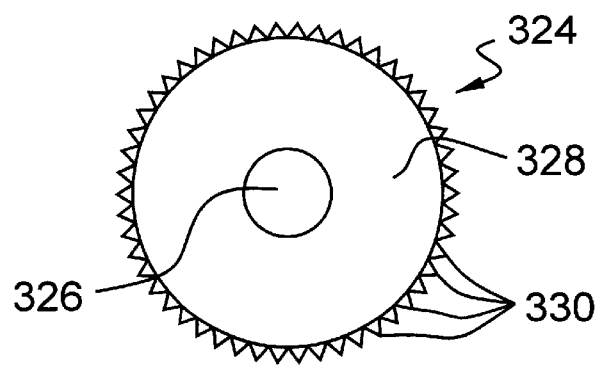

FIGS. 28A and 28B are views of a bushing with post for use with the second embodiment of an electrical interconnection system according to the present invention.

Figure 29A:
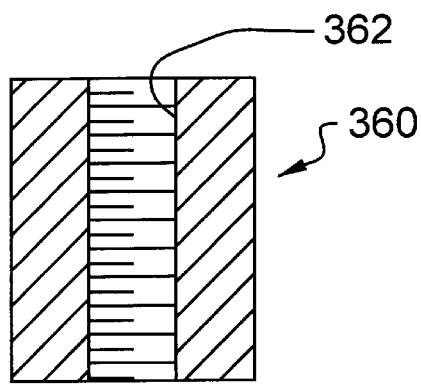
Figure 29B:
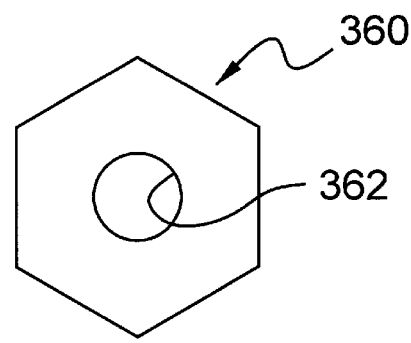

FIGS. 29A and 29B are views of a first type 2 fastener for use with the bushing with post as shown in FIGS. 28A and 28B.

Figure 30A:
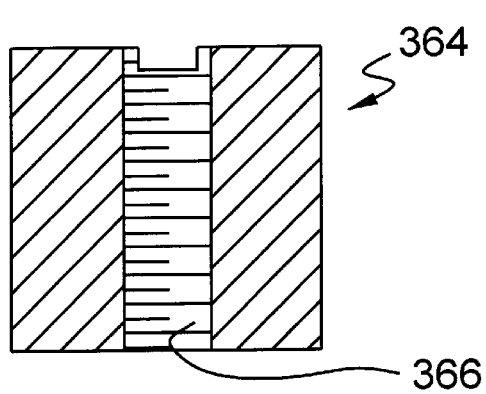
Figure 30B:
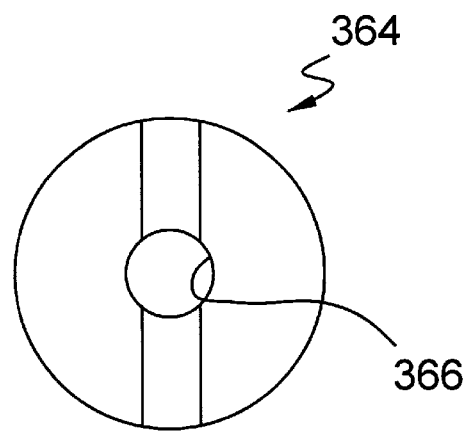

FIGS. 30A and 30B are views of a second type 2 fastener for use with the bushing with post as shown in FIGS. 28A and 28B.

Figure 31A:
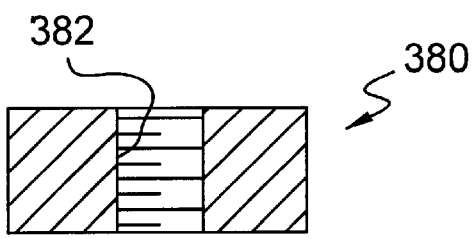
Figure 31B:
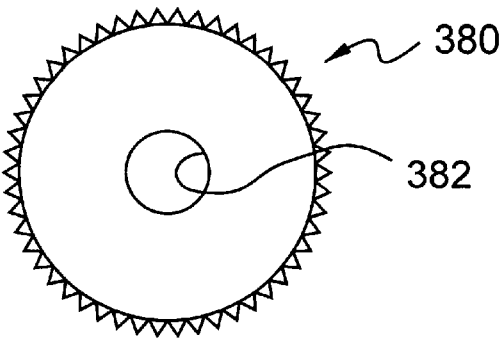

FIGS. 31A and 31B are views of a bushing with a threaded hole for use with the second embodiment of an electrical interconnection system according to the present invention.

Figure 32A:
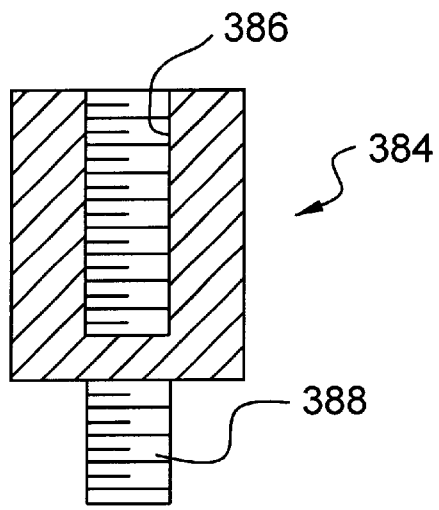
Figure 32B:
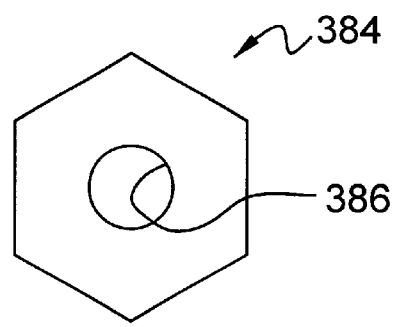

FIGS. 32A and 32B are views of a first type 2 fastener for use with the bushing with threaded hole as shown in FIGS. 31A and 31 B.

Figure 33A:
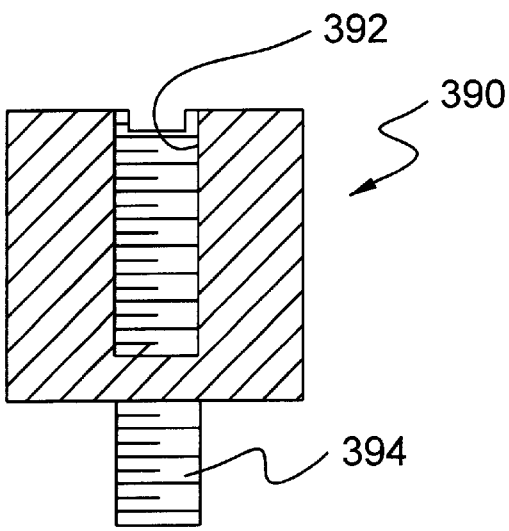
Figure 33B:
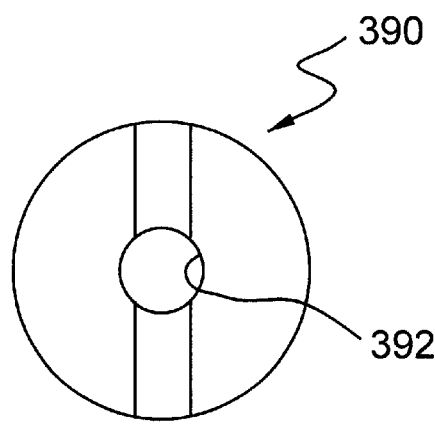

FIGS. 33A and 33B are views of a second type 2 fastener for use with the bushing with threaded hole as shown in FIGS. 31A and 31B.

Figure 34:
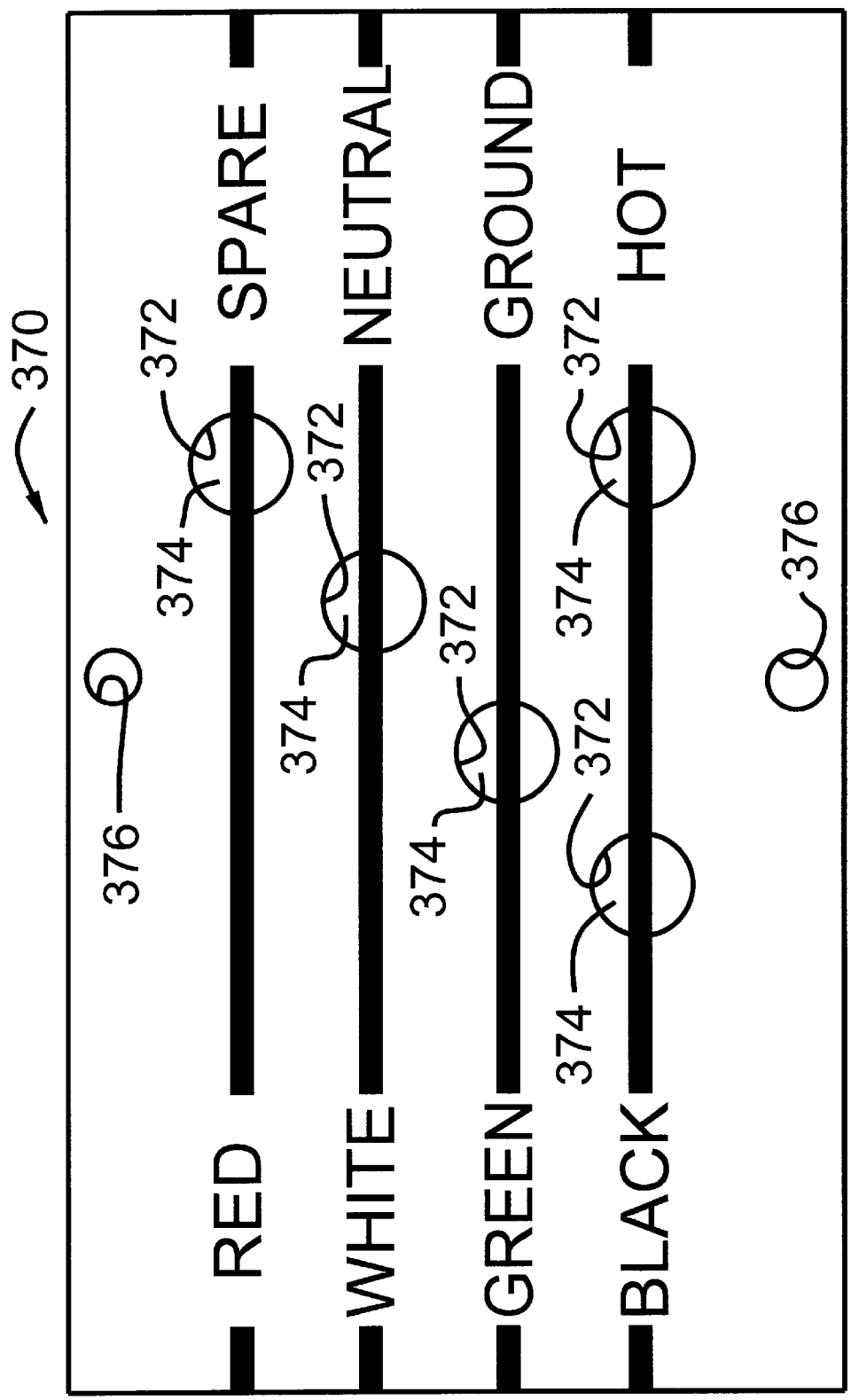

FIG. 34 is a plan view of the optional cover plate for use with the second embodiment of an electrical interconnection system according to the present invention.

FIG. 35 is a fragmentary exploded view showing a finger-tightenable screw being used with the second embodiment of the present invention to provide wire hook-ups to other circuit components.

Figure 36B:
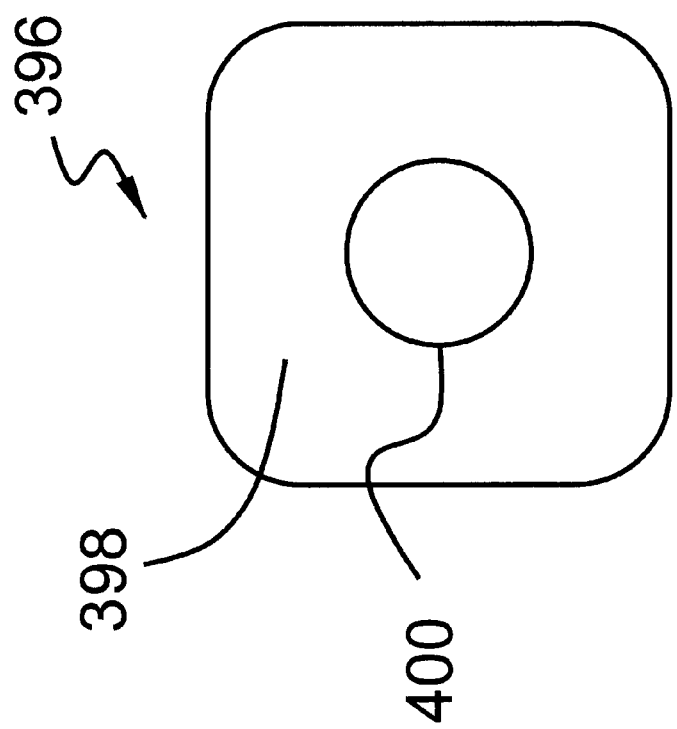
Figure 36A:
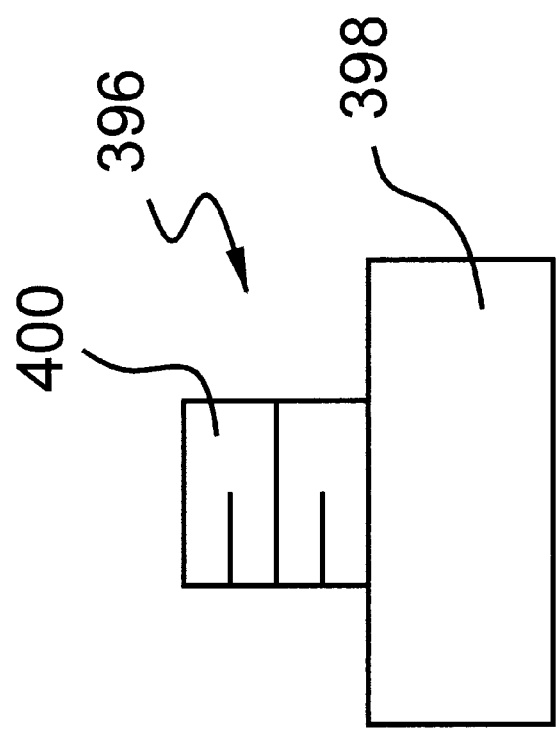

FIGS. 36A and 36B are views showing a second alternative shape suitable for the outer perimeter of the bushing with post.

Figure 37:
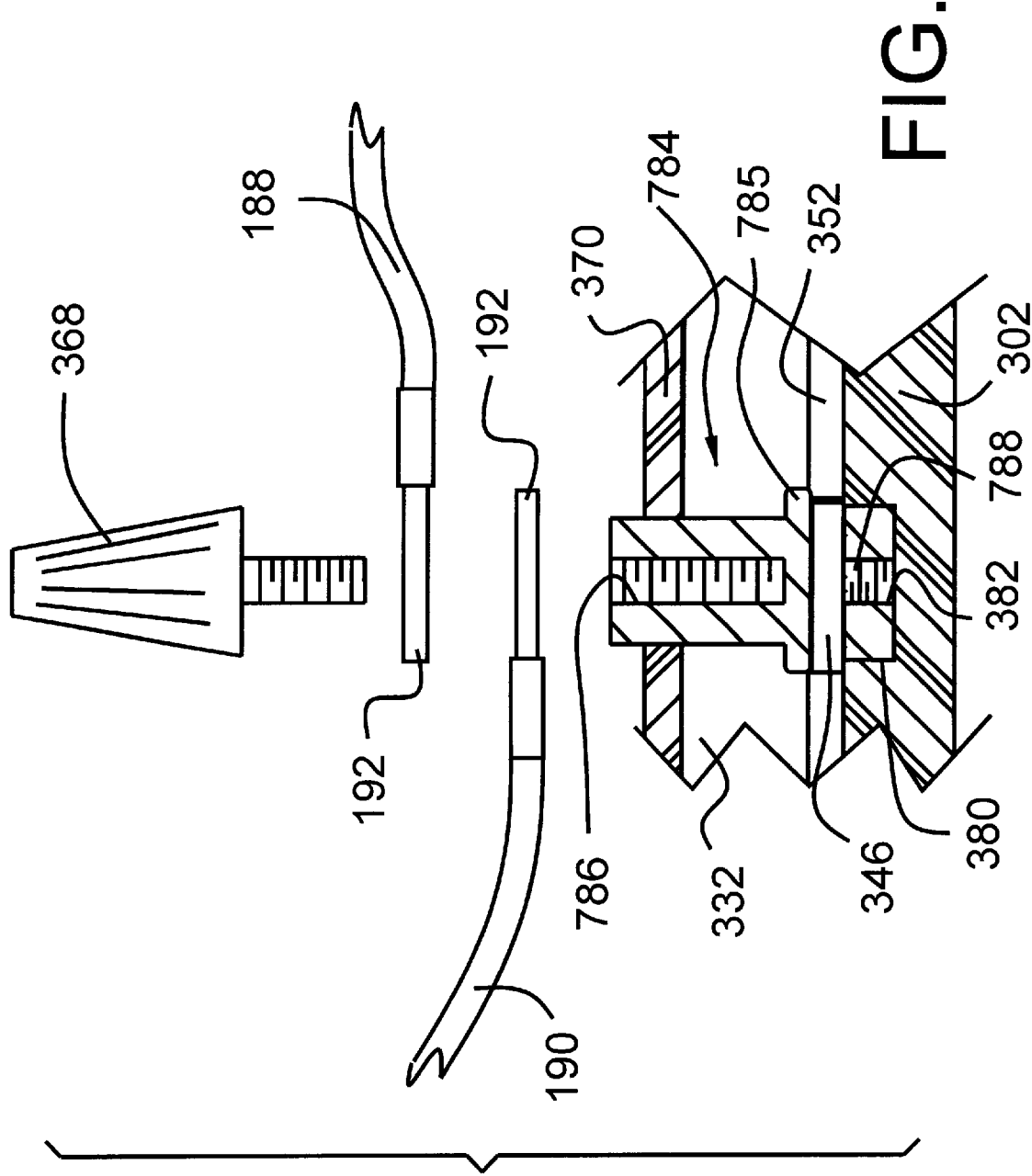

FIG. 37 is a fragmentary exploded view showing yet another alternative type 2 fastener and fastener support combination for use with the second embodiment of the present invention.

Figure 38:
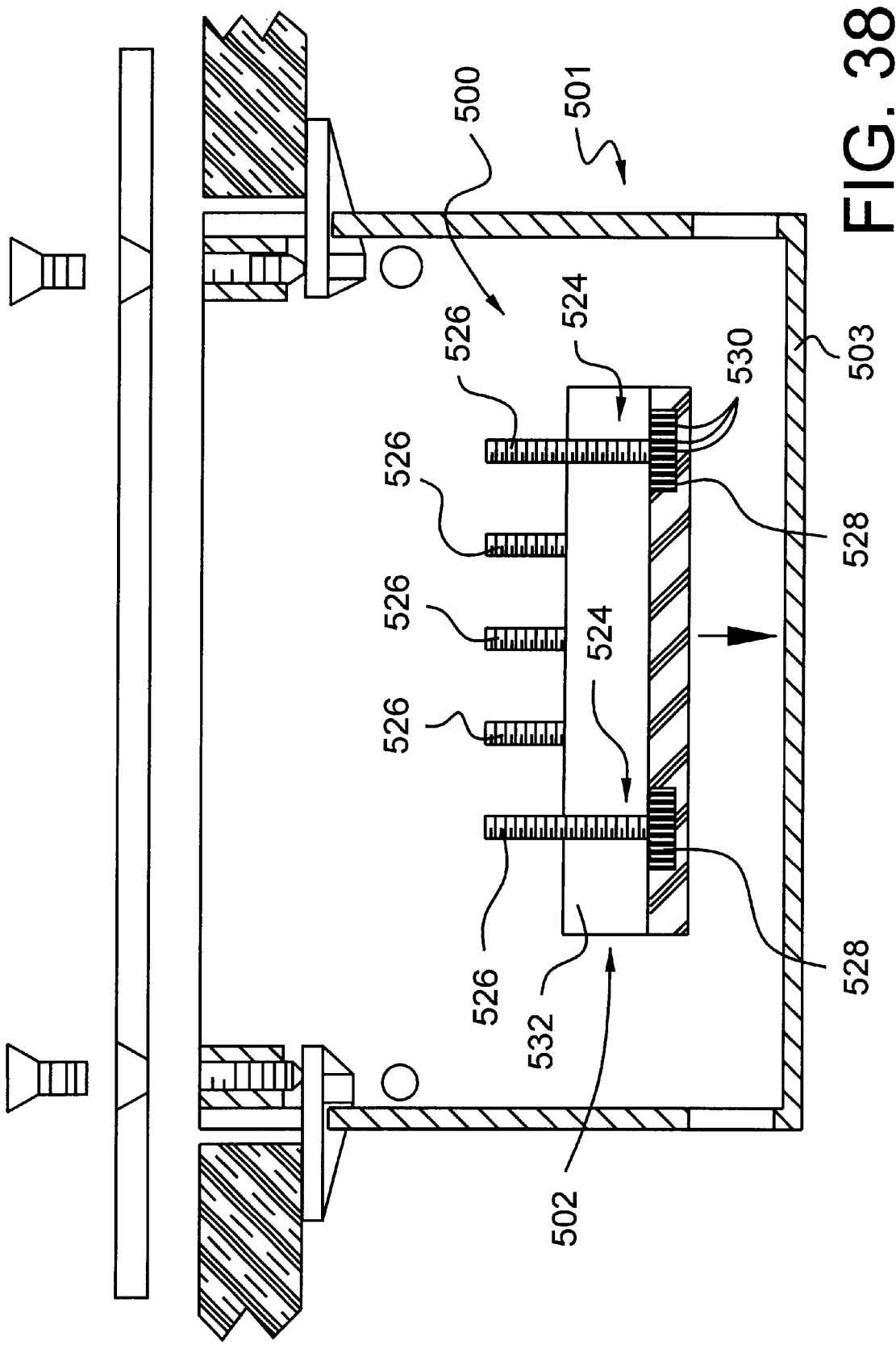

FIG. 38 is a cross sectional view of a third embodiment of an electrical interconnection system according to the present invention.

Figure 39:
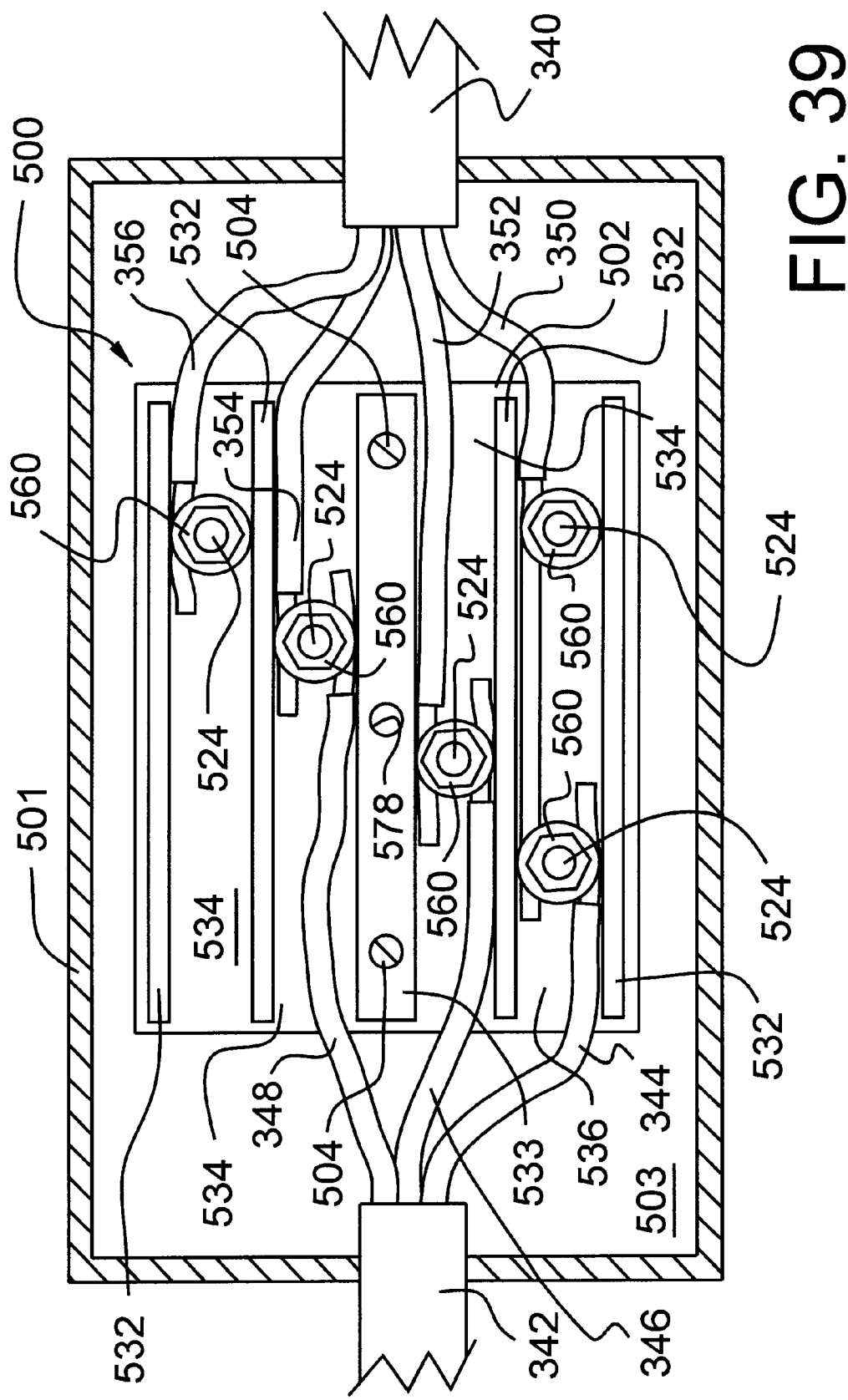

FIG. 39 is a plan view of the third embodiment of an electrical interconnection system according to the present invention showing wires connected to the electrical interconnection system in a configuration suitable for use with a receptacle.

Figure 40:
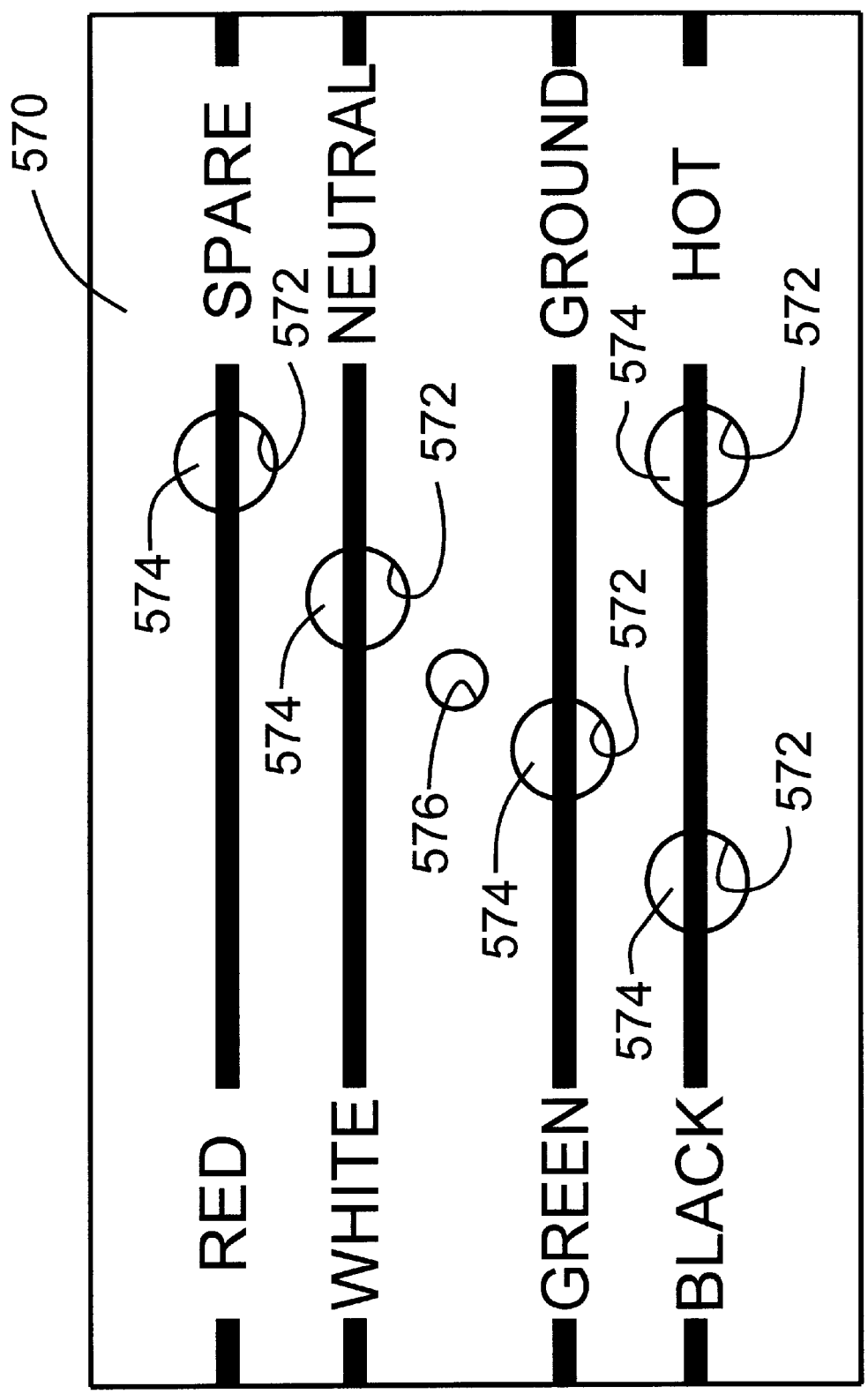

FIG. 40 is a plan view of the optional cover plate for use with the third embodiment of an electrical interconnection system according to the present invention.

4

Figure 41:
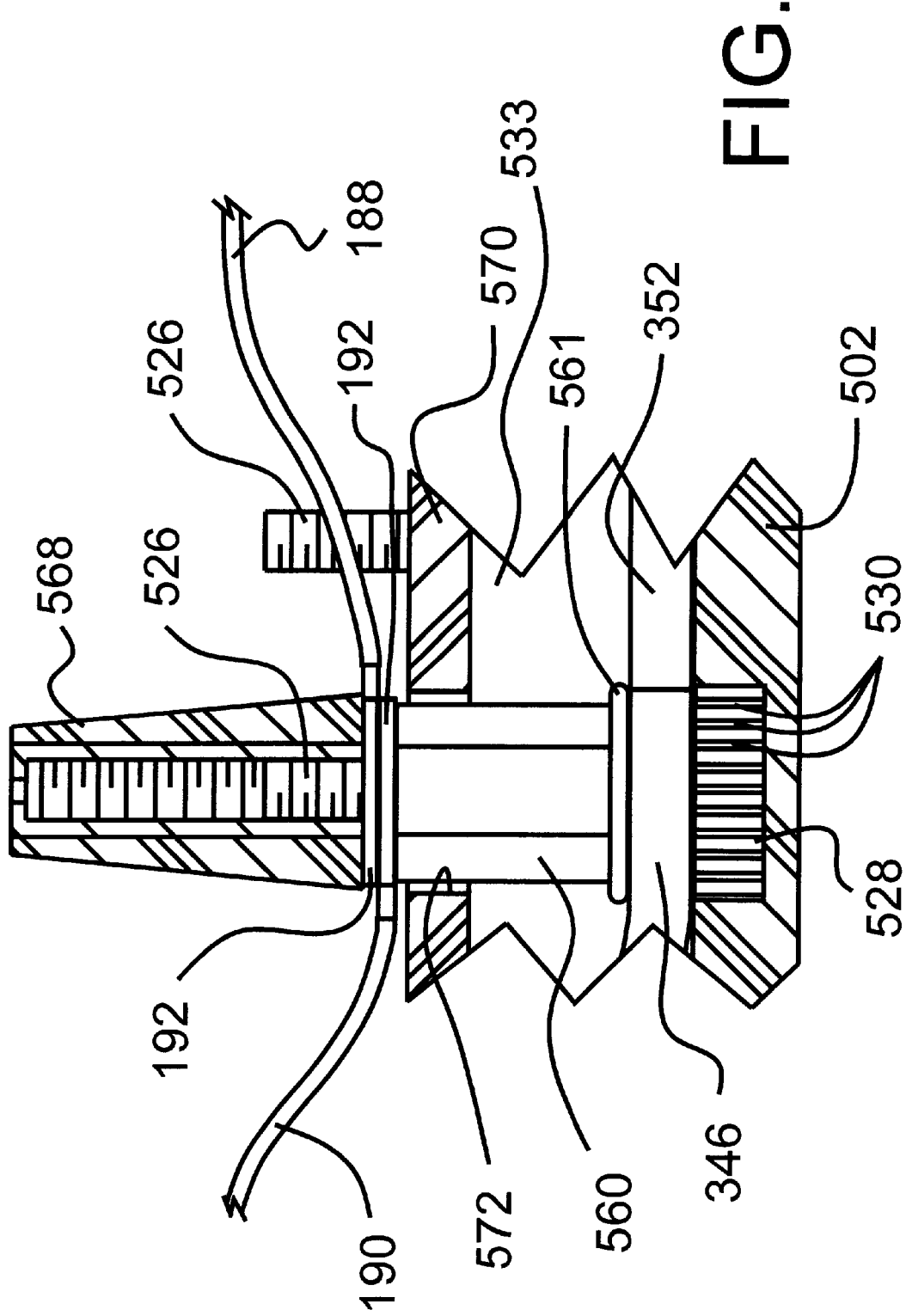

FIG. 41 is a fragmentary exploded view showing a finger-tightenable nut being used with the third embodiment of the present invention to provide wire hook-ups to other circuit components.

Figure 42:
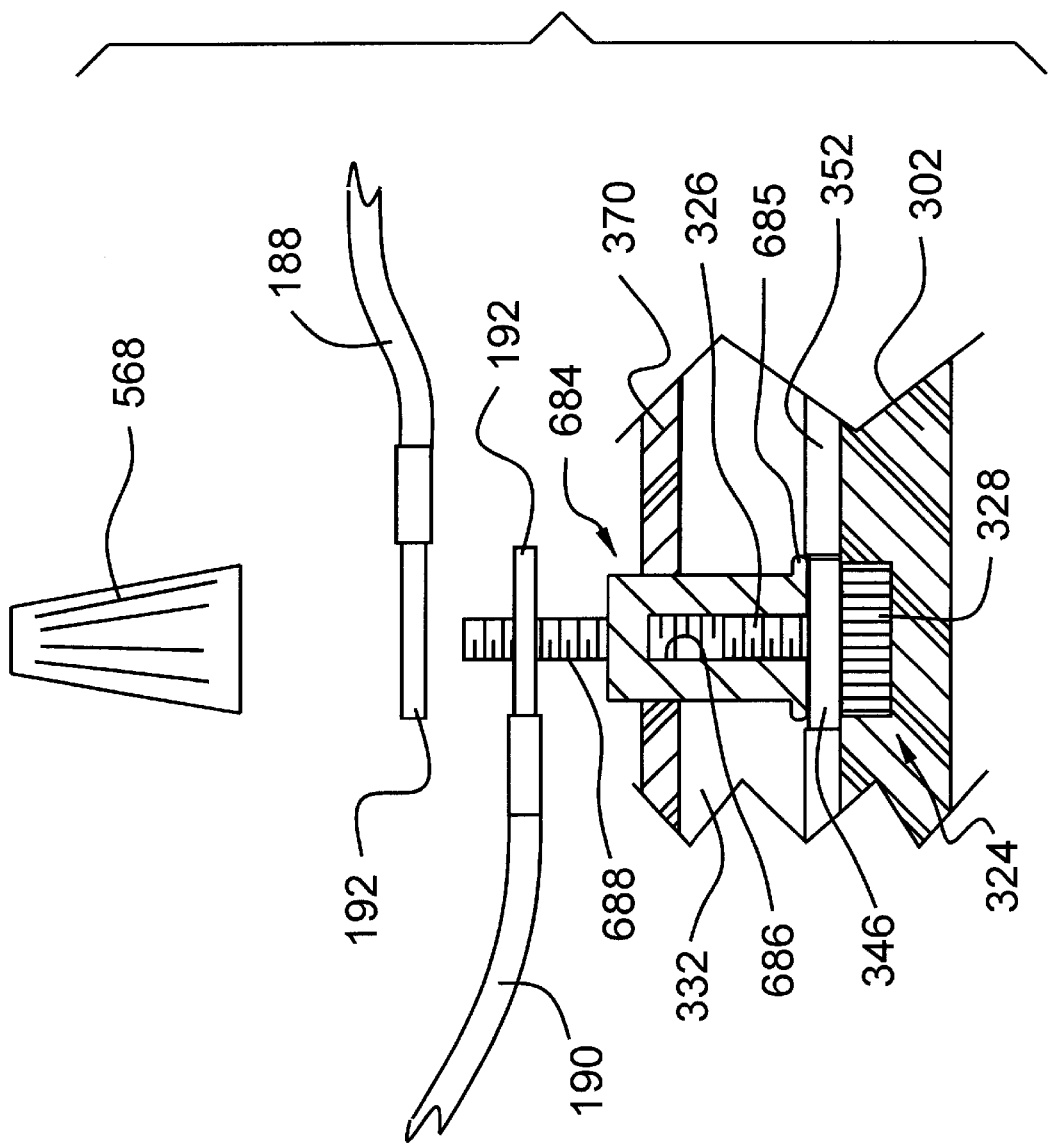

FIG. 42 is a fragmentary exploded view showing yet another alternative type 2 fastener and fastener support combination for use with the second embodiment of the present invention.

Figure 43:
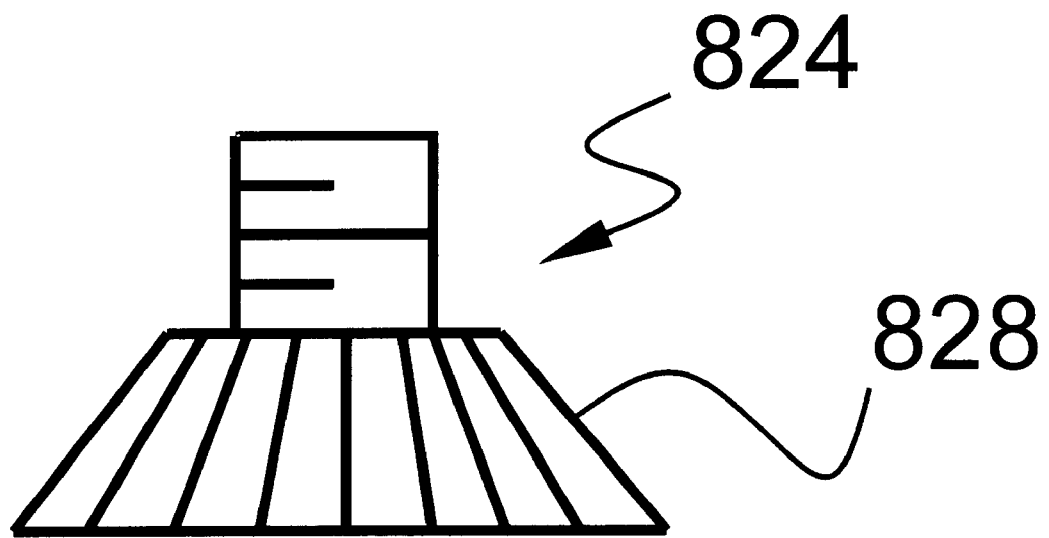

FIG. 43 is an elevational view of a fastener support having a tapered base portion.

Like reference numerals indicate like elements throughout the several views.

DETAILED DESCRIPTION OF THE INVENTION

Referring to FIGS. 2–23C, a first illustrative example of a wiring system 100 according to the present invention can be seen. The wiring system 100 includes a non-conductive, lightweight, plastic block 102 containing a plurality of longitudinal passages or bores 104 that pass completely through the block. The block 102 is provided with a pair of wings or flanges 106 on either side thereof. Each flange 106 has a counter-sunk or counter-bored hole 108 passing therethrough. The holes 108 are used in conjunction with fasteners such as screws to mount the block 102 on the interior surface of the bottom 110 of a Junction box 112. In the illustrated embodiment, each of the passages 104 has a cross section roughly in the shape of a rectangle with rounded corners. A non-circular cross section for the passages 104 is preferred over a circular cross section for reasons that will become apparent later, however, the passages 104 may have circular cross sections and still function as intended.

The block 102 also has a number of clearance holes 114. The clearance holes 114 are divided into groups, the groups corresponding in number to the passages 104. The clearance holes 114 in each group of clearance holes are in communication with a respective one of the passages 104. Each of the clearance holes 114 has an open top that is accessible from above the block 102. Each of the clearance holes 114 extends in a direction substantially perpendicular to the longitudinal axis of the respective passage 104 that is in communication with the clearance hole.

The wiring system 100 also includes a plurality of buss bars 116. Each of the buss bars 116 is sized such that it can be received within a respective one of the passages 104. Each buss bar 116 has a cross section perimeter that matches the cross section of the respective passage 104 within which the buss bar is received. Each buss bar in turn has an axial passage 118 that extends through the buss bar in the direction of the longitudinal axis of the buss bar. In the illustrated example, the axial passages are cylindrical. Each buss bar has a plurality of threaded holes 120 extending from the exterior or outer surface of the buss bar to the axial passage 118 extending through the buss bar. Each bus bar is made of a conductive material such as, for example, copper, brass, other metals, etc. The length of each buss bar 116 is shorter than the length of the respective passage 104 to ensure that no portion of the buss bar projects outside its respective passage 104 so as to avoid the possibility of short circuits. The plurality of threaded holes in each buss bar is equal in number to the plurality of clearance holes in the respective passage 104. The threaded holes 120 are positioned along the length of the buss bars such that each of the threaded holes registers with a respective clearance hole 114 when a buss bar is positioned within a respective one of the passages 104. The non-circular cross section of the buss bars helps to ensure that the threaded holes 120 are maintained in proper alignment with their respective clearance holes 114 after the buss bars are positioned within the passages 104. To simplify manufacture, all the passages 104 have the same number of clearance holes and all the buss bars 116 have the same number of threaded holes. In the illustrated embodiment, each passage 104 has four clearance holes while each buss bar has four threaded holes. The axial passage of each buss bar is dimensioned to receive an end portion of a wire from which insulation has been striped. A bare end portion of wire can be inserted into the axial passage of each buss bar from either end of each buss bar after the buss bar is placed in the respective passage 104. In the illustrated embodiment, the axial passage of each buss bar has a diameter large enough to permit wires ranging in size from number 6 to number 16 to be inserted into the axial passage.

The wiring system 100 also includes a plurality of fasteners 122. The fasteners 122 are screws and have a threaded shaft and a head. The head is provided with some type of slot or recess adapted for engagement by a driver tool. For example, the heads of the fasteners 122 may be slotted for engagement by a standard screwdriver. Alternatively, the fasteners 122 may have recesses of the Phillips, TORX®, or hex types, or the fasteners 122 may have heads adapted for engagement by a nut driver. The fasteners 122 are referred to herein as type 1 fasteners. In addition, to the type 1 fasteners, the wiring system 100 includes one or more type 2 fasteners. "Type 2 fastener" as used herein refers to any fastener that has a head or upper portion adapted for engagement with an electrical connector. Type 2 fasteners are also referred to herein as fasteners of the second type. Preferably, a plurality of type 2 fasteners are supplied with each wiring system 100. Fasteners 124 and 126 are examples of type 2 fasteners. Fastener 124 has a threaded shaft 128 and a bulbous head 130 that has a recess 132 adapted for engagement by an Allen type wrench to tighten or undo the fastener. The bulbous head is adapted for releasable engagement with a socket-type, snap-on electrical connector 134. Fastener 126 has a threaded shaft 136 and an elongated cylindrical head 138. The elongated cylindrical head 138 has a threaded bore 140 that is open at the top of the head and is coaxial with the threaded shaft of the fastener 126. Slots 142 on either side of the opening at the top of the head of the fastener 126 allow a standard screwdriver to be used to tighten or undo the fastener. A third example of a type 2 fastener 144 has a threaded shaft 146 and an elongated cylindrical head 148 having a bore 150 that is open at the top of the head. As with the fastener 126, the third type 2 fastener 144 has slots on either side of the opening at the top of the head of the fastener to allow a standard screwdriver to engage the head of the fastener and be used to tighten or undo the fastener. The bore in the head of the third type 2 fastener is adapted to receive a single prong electrical connector 152.

Also included in the wiring system 100 may be an optional cover plate 154. The cover plate 154 allows the wiring system to be customized for a particular application at the site where the wiring system is being installed. In addition, the cover plate provides indicia that help the electrician correctly connect the electrical fixture to the wiring every time. The cover plate is provided with screw holes 156 that allow the cover plate to be secured over the block 102 within the junction box. The cover plate 154 has a number of sets of openings 158, there being one set of openings 158 for each passage 104. The number of openings 158 in each set matches the number of clearance holes 114 that are in communication with the corresponding passage 104. Furthermore, each of the openings 158 in each set of openings registers with a respective one of the clearance holes 114 that are in communication with the passage 104 that corresponds to the particular set of openings. Each of the openings 158 in the cover plate is closed off by a cover 160 known as a "knockout" that is shaped to substantially fill the opening. The knockout 160 is attached to the cover plate by a frangible connection that allows the knockout to be relatively easily punched out of the corresponding opening. The term "frangible connection" as used herein applies to any type of connection that allows the knockout to be relatively easily punched out of the corresponding opening. As an example, the frangible connection can be formed by partially cutting around a portion of the cover plate as both the opening and the corresponding knockout are being simultaneously defined.

In use, the installer selects the locations in the block 102 for the required number of type 2 fasteners for the particular application. The installer then removes the knockouts from the holes corresponding to the locations of the type 2 fasteners. The plate is then secured over the block 102 within the junction box using, for example, four self-tapping screws. The cover plate may have indicia such as color-coding and/or written labels to indicate what type of wire is connected to the buss bar underlying each set of holes. The labels may be supplied separately as a set of self-adhesive labels supported by a releasable backing for added flexibility in customizing the wiring system 100 for any particular application. The color-coding may be in the form of colored lines extending in parallel and each being superimposed above the respective buss bar. As is the standard practice, white would indicate the neutral wire, green would indicate the ground wire, and black would indicate the hot wire. For wiring systems having four conductors, a fourth set of holes 158 corresponding to a fourth passage 104 can be provided in the cover 154. This fourth set of holes would be color coded red which is indicative of the spare wire. The cover plate 154 is preferably made of rigid, non-conductive plastic approximately one eighth of an inch thick. In a substantial number of applications only two to four type 2 fasteners would be visible from above the cover plate such that these type 2 fasteners would be accessible for attachment of wires having electrical connectors that match the type 2 fasteners. The wires which connect to the type 2 fasteners from above the cover plate electrically connect devices such as switches, receptacles, lighting fixtures, fans, etc., to the power source wiring in electrical contact with the buss bars.

Figure 1:
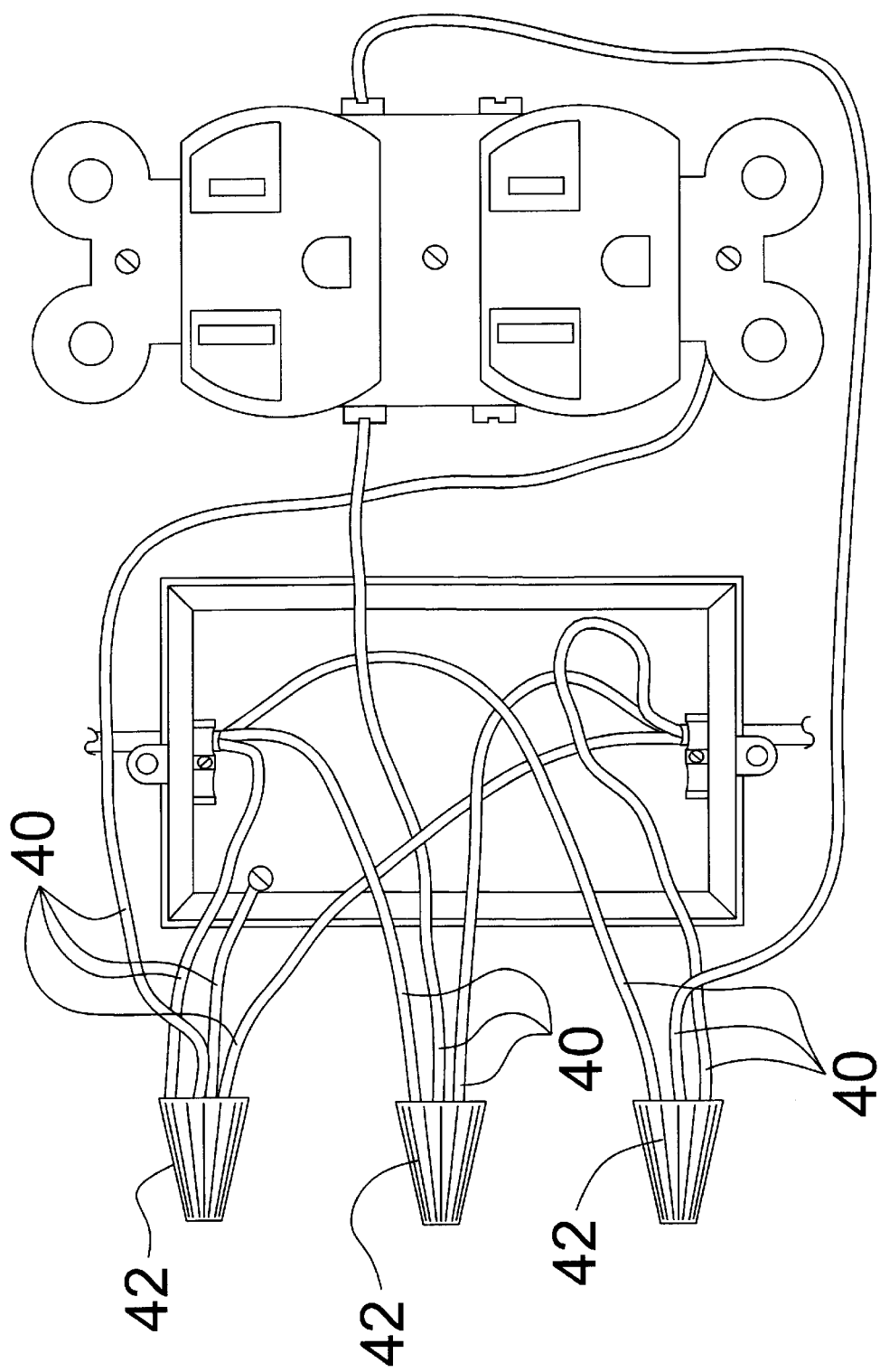
FIG. 1 is an environmental view of a prior art system for interconnecting wires using pigtails and traditional connectors.
Figure 2:
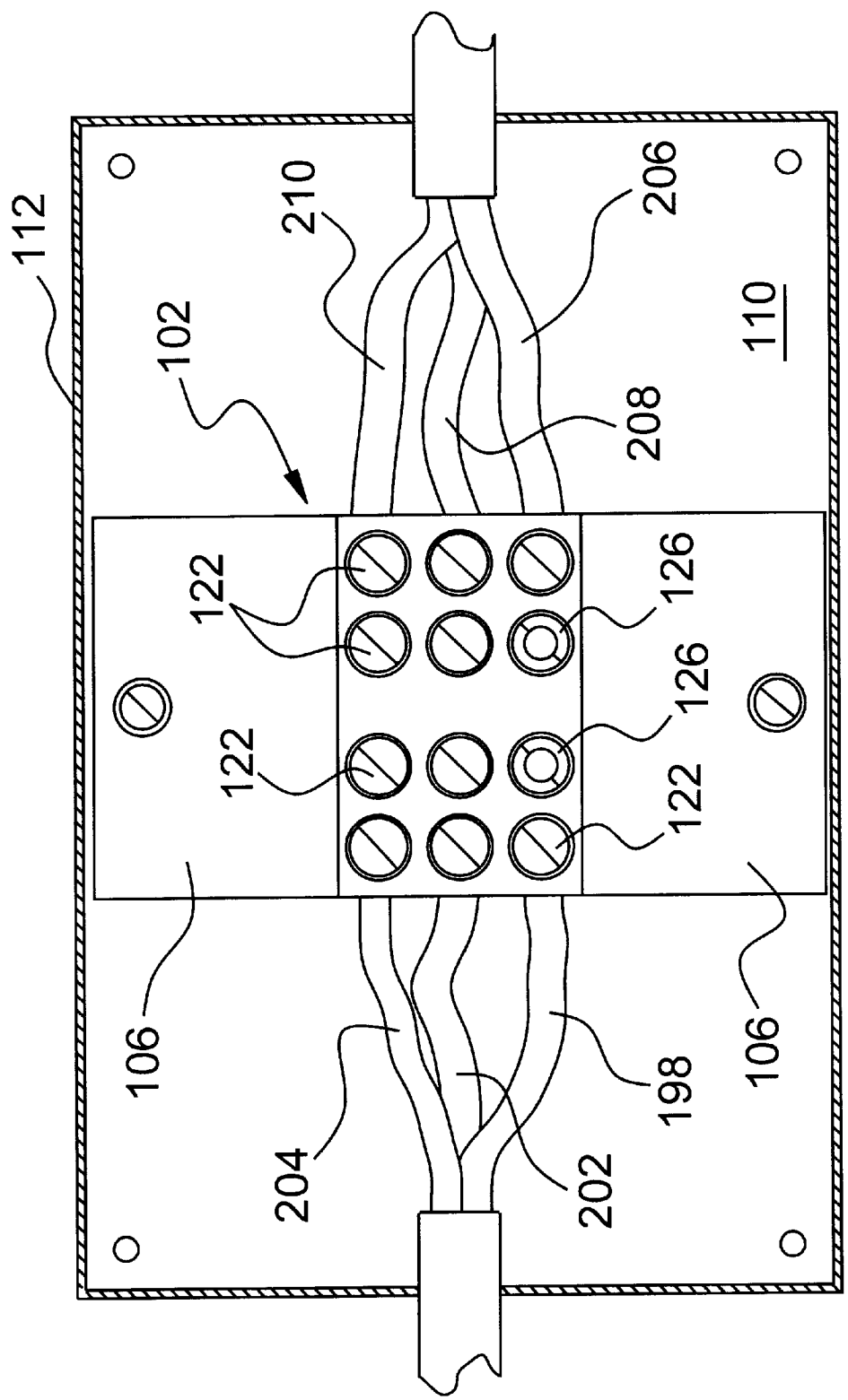
FIG. 2 is a plan view of a first embodiment of an electrical interconnection system according to the present invention.
Figure 3:
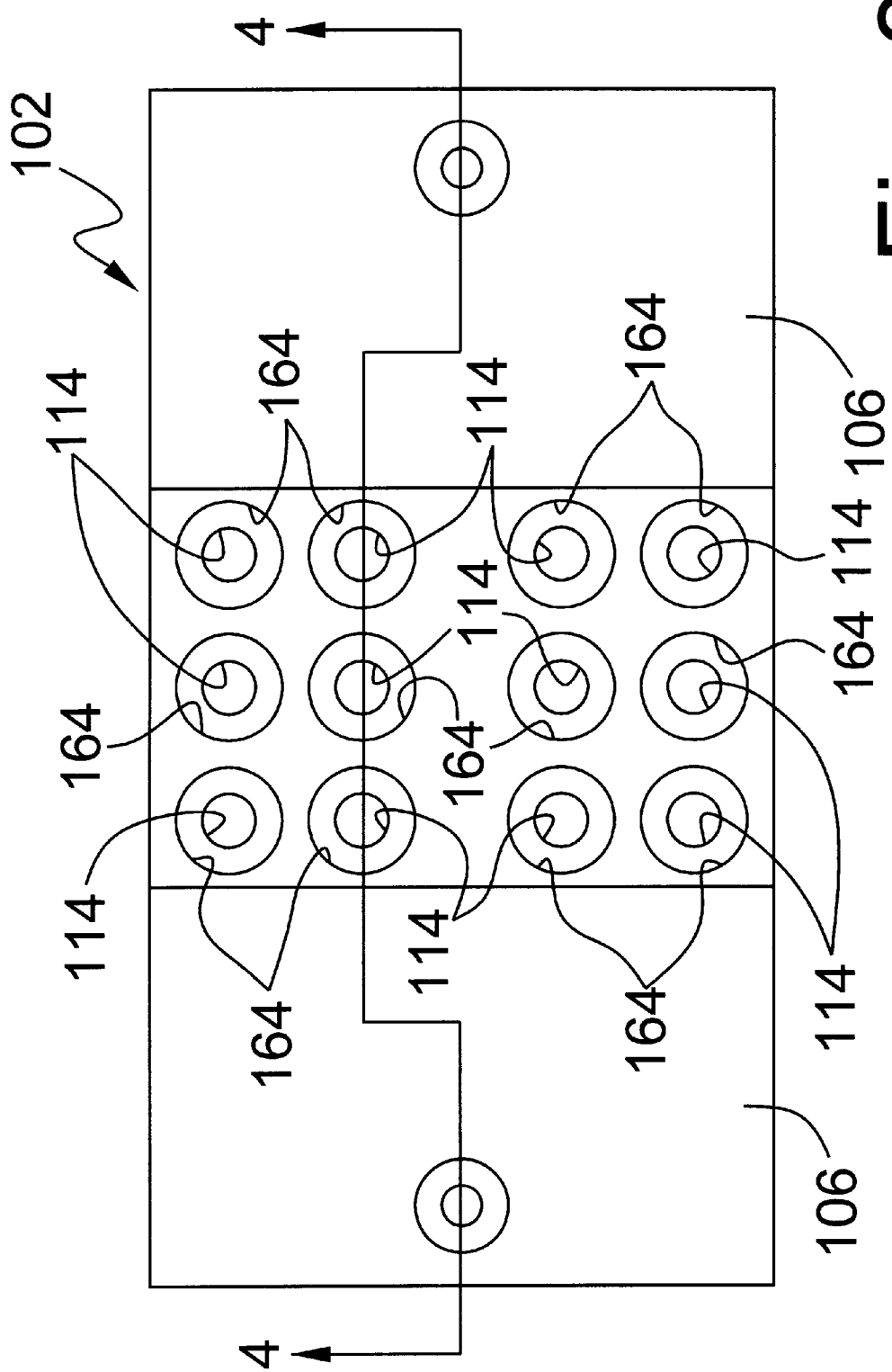
FIG. 3 is a plan view of the insulating block used with the first embodiment of the electrical interconnection system according to the present invention.
Figure 4:
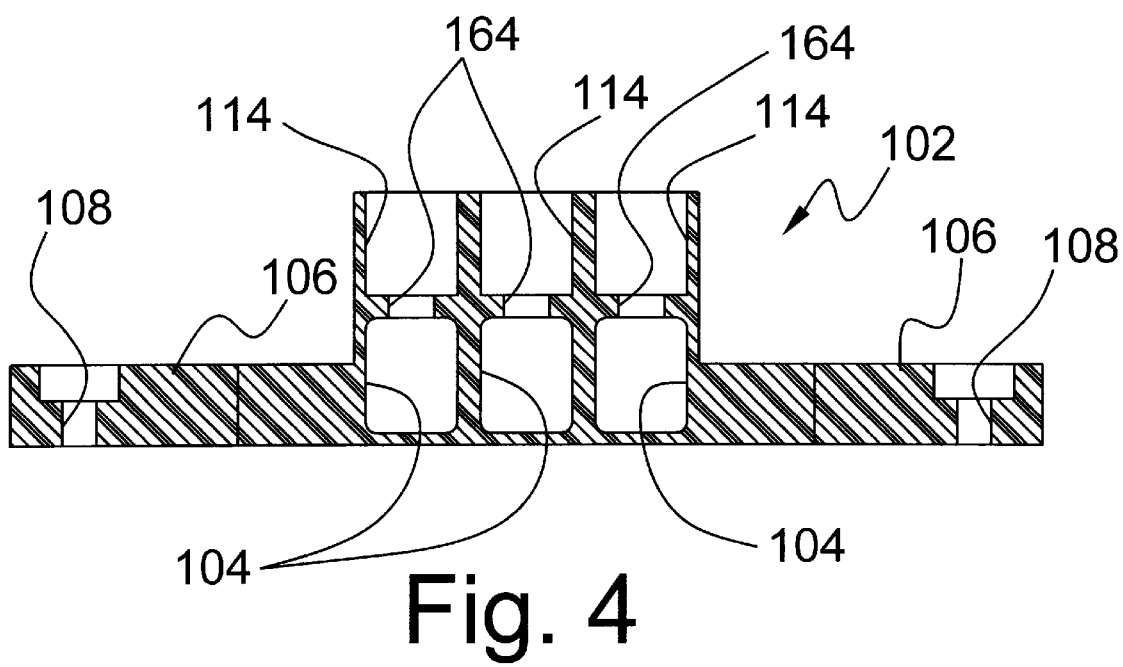
FIG. 4 is a cross sectional view of the insulating block of the first embodiment of the electrical interconnection system according to the present invention taken along the line 4—4.
Figure 5:
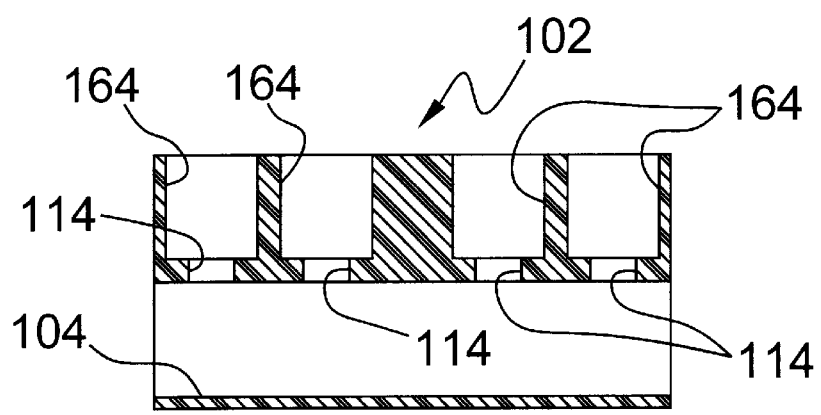
FIG. 5 is a cross sectional view of the insulating block of the first embodiment of the electrical interconnection system according to the present invention taken through the longitudinal axis of one of the longitudinal passages that extend through the block.
Figure 6:
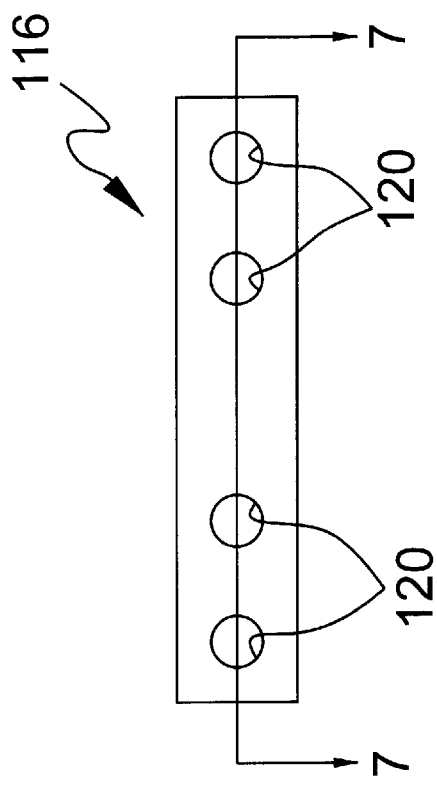
FIG. 6 is a top plan view of a long buss bar for use with the first embodiment of the electrical interconnection system according to the present invention.
Figure 8:
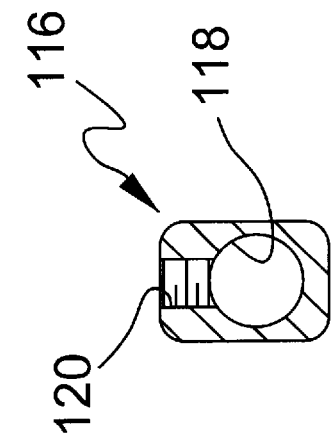
FIG. 8 is a cross sectional view of a buss bar for use with the first embodiment of the electrical interconnection system according to the present invention taken transversely to the longitudinal axis of the buss bar through one of the threaded holes in the buss bar.
Figure 7:
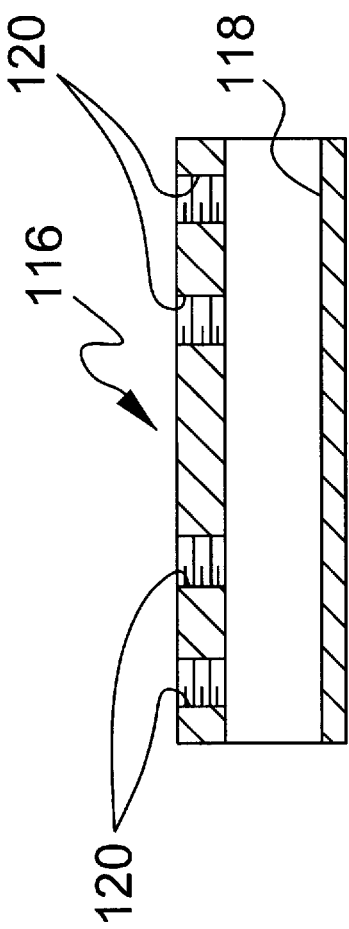
FIG. 7 is a cross sectional view of a long buss bar for use with the first embodiment of the electrical interconnection system according to the present invention taken along the line 7—7.
Figure 9:
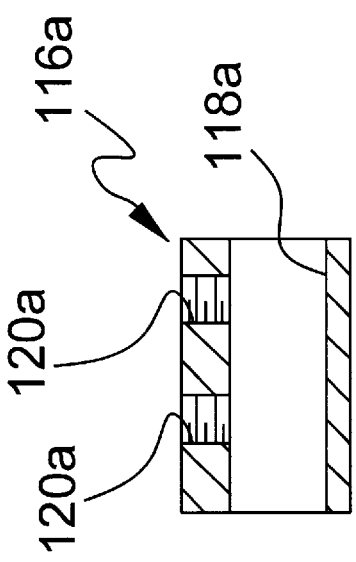
FIG. 9 is a cross sectional view of a short buss bar for use with the first embodiment of the electrical interconnection system according to the present invention.

The installation of wiring to complete electrical circuits in residences, commercial buildings, offices, etc., is made unnecessarily difficult by placing stiff wires, wire nuts, tape, pigtails, etc. within the confines of a small electric switch box, outlet box, or junction box as illustrated in FIG. 1. Often two or more wires are used where only one wire will suffice. This process can be greatly simplified and made safer by utilizing the wiring system 100. The operation and use of the wiring system 100 should be readily apparent to all electricians, "do-it-yourself" homeowners, and handy men.

Figure 11:
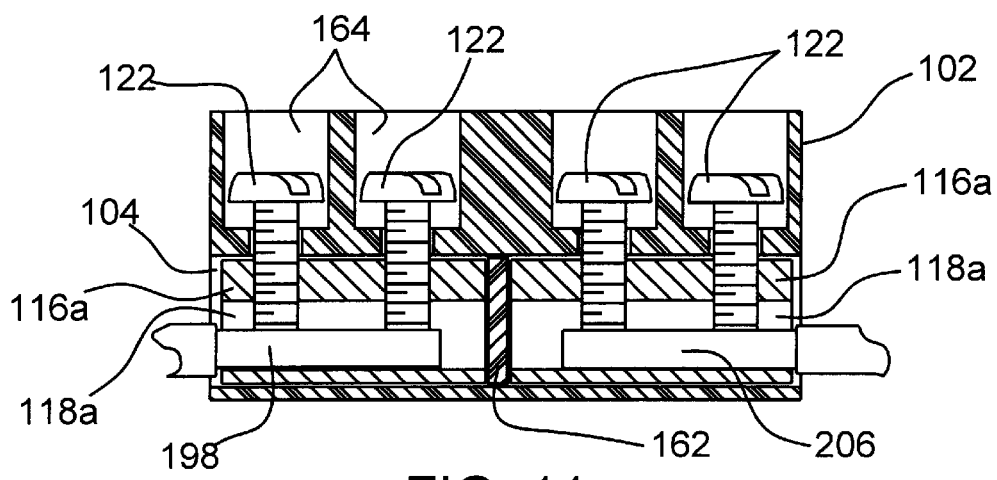
FIG. 11 is a cross sectional view showing short buss bars together with an optional insulating spacer positioned within the insulating block of the first embodiment of the electrical interconnection system according to the present invention.

When the wiring system 100 is being used in a switch box, one of the buss bars 116 may be replaced by two shorter buss bars 116a. When the two short buss bars 116a are installed in one of the passages 104, a gap of about one eighth of an inch is left between the short buss bars 116a. The gap between the short buss bars 116a may remain as an air gap. Alternatively, an insulating spacer plate 162 may be provided in the gap between the short buss bars 116a as shown in FIG. 11. In this way the incoming hot wire is insulated from the outgoing hot wire, and all current in the hot wire is routed through the switch via type 2 fasteners and wire segments equipped with connectors appropriate for the particular type of type 2 fastener. Although it is possible to make the insulating spacer integral with the block 102 such that the passage 104 corresponding to the hot wire buss is split into two compartments, this arrangement reduces the commonality of parts and necessitates the manufacture of a specialized block 102 for switch boxes. The block 102 may have three, four, five, or even more passages 104. For typical applications the block 102 would have three passages 104. This type of block 102 would be best suited for buildings having a three conductor wiring system. As stated previously, in a three conductor wiring system one passage 104 would correspond to the hot wire, one passage 104 would correspond to the ground wire, and one passage 104 would correspond to the neutral wire. When the block 102 having three passages 104 is applied to a switch box then the two short buss bars 116a would have to be used in the hot wire passage 104.

For use in buildings having four conductor wiring systems the block 102 would have four passages 104. In the four-passage block 102 one passage 104 would correspond to the hot wire, one passage 104 would correspond to the ground wire, one passage 104 would correspond to the neutral wire, and one passage 104 would correspond to the spare wire. The four-passage block may also be applied to wiring systems having three conductors. In this case one of the passages 104 may remain unused. When the four-passage block 102 is used in a three-conductor wiring system, the installer has the option of connecting the incoming hot wire to the hot wire buss and the outgoing hotwire to the spare buss, thus obviating the need for using a two-piece buss in switch applications. In such a case both busses would be marked with black color-coding, however, the buss corresponding to the incoming hot wire may be labeled with a "+" sign and the buss corresponding to the outgoing hot wire would be labeled with a "−" sign on the cover plate. Using a five-passage block in a four-conductor wiring system may similarly obviate the need for a two-piece buss in switch applications and lead to greater standardization.

The electrical junction box to which the block 102 is applied would have threaded holes aligned with the mounting holes 108 in the block 102. The block 102 can then be secured to the junction box using standard fasteners. The block 102 can be marked with words and colored lines above each buss for ease of connecting the proper wire into the proper buss. By making the busses removable, identical plastic blocks will accommodate both the switch application and the other applications by simply inserting a two short buss bars, separated by a one-eighth inch air gap or an insulating spacer, in the passage 104 that corresponds to the hot wire.

The clearance holes 114 have upper portions 164 that are larger in diameter so as to allow the heads of type 1 fasteners to be received therein when the type 1 fasteners are engaged to the threaded holes in the busses 116, 116a. This arrangement helps reduce the probability of short circuits. The wiring system 100 would be supplied with type 1 screws partially inserted through the block into all the busses in order to hold the busses in place until the wiring system 100 is placed in service.

Figure 12:
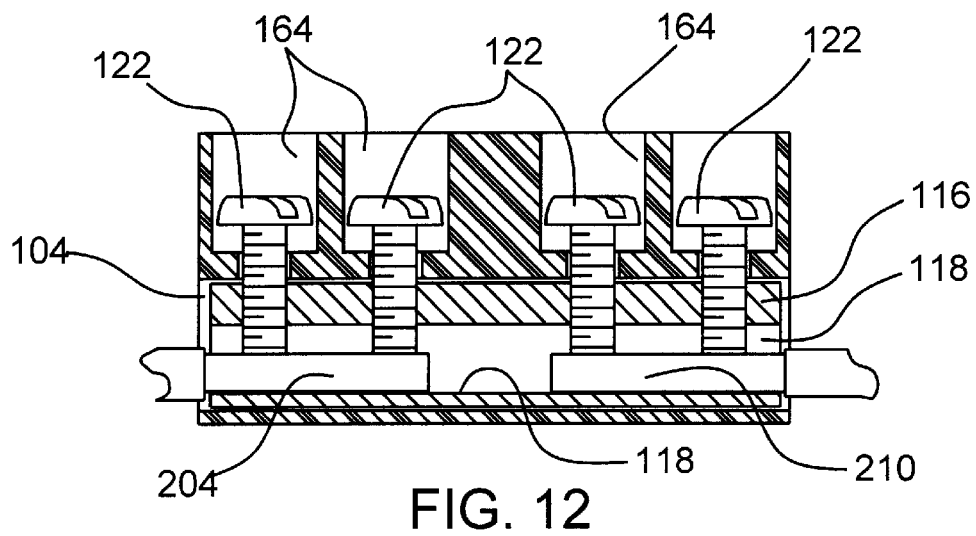
FIG. 12 is a cross sectional view showing a long buss bar positioned within the insulating block of the first embodiment of the electrical interconnection system according to the present invention.
Figure 14:
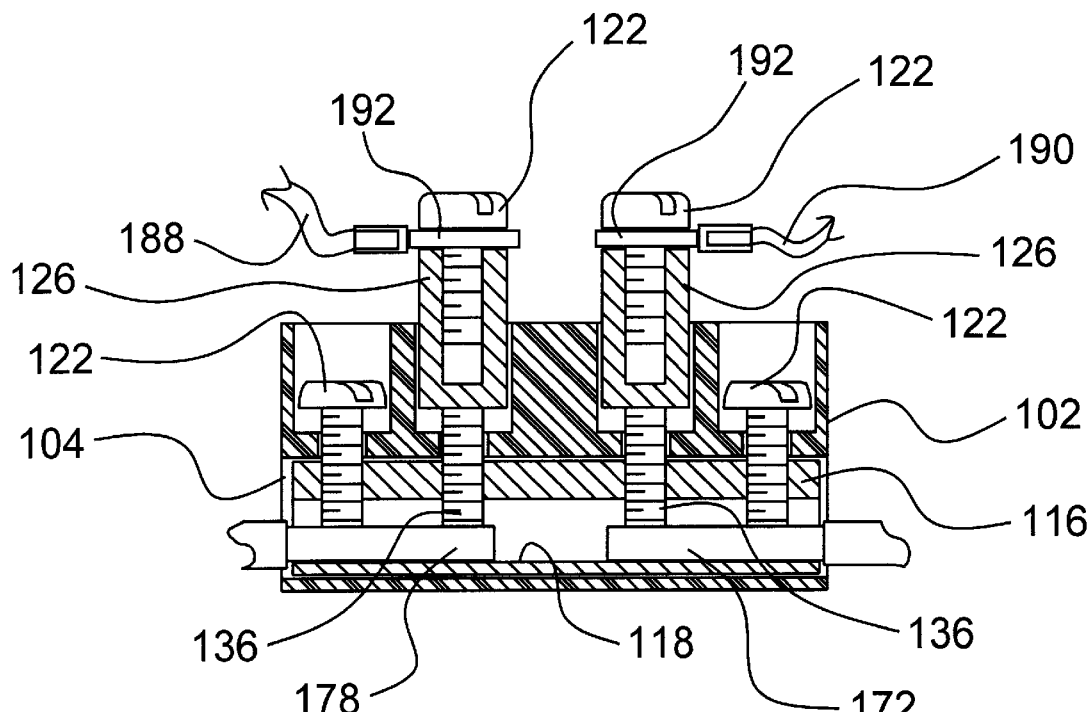
FIG. 14 is a cross sectional view showing a long buss bar positioned within the insulating block of the first embodiment of the electrical interconnection system according to the present invention together with connections to other circuit components.
Figure 20:
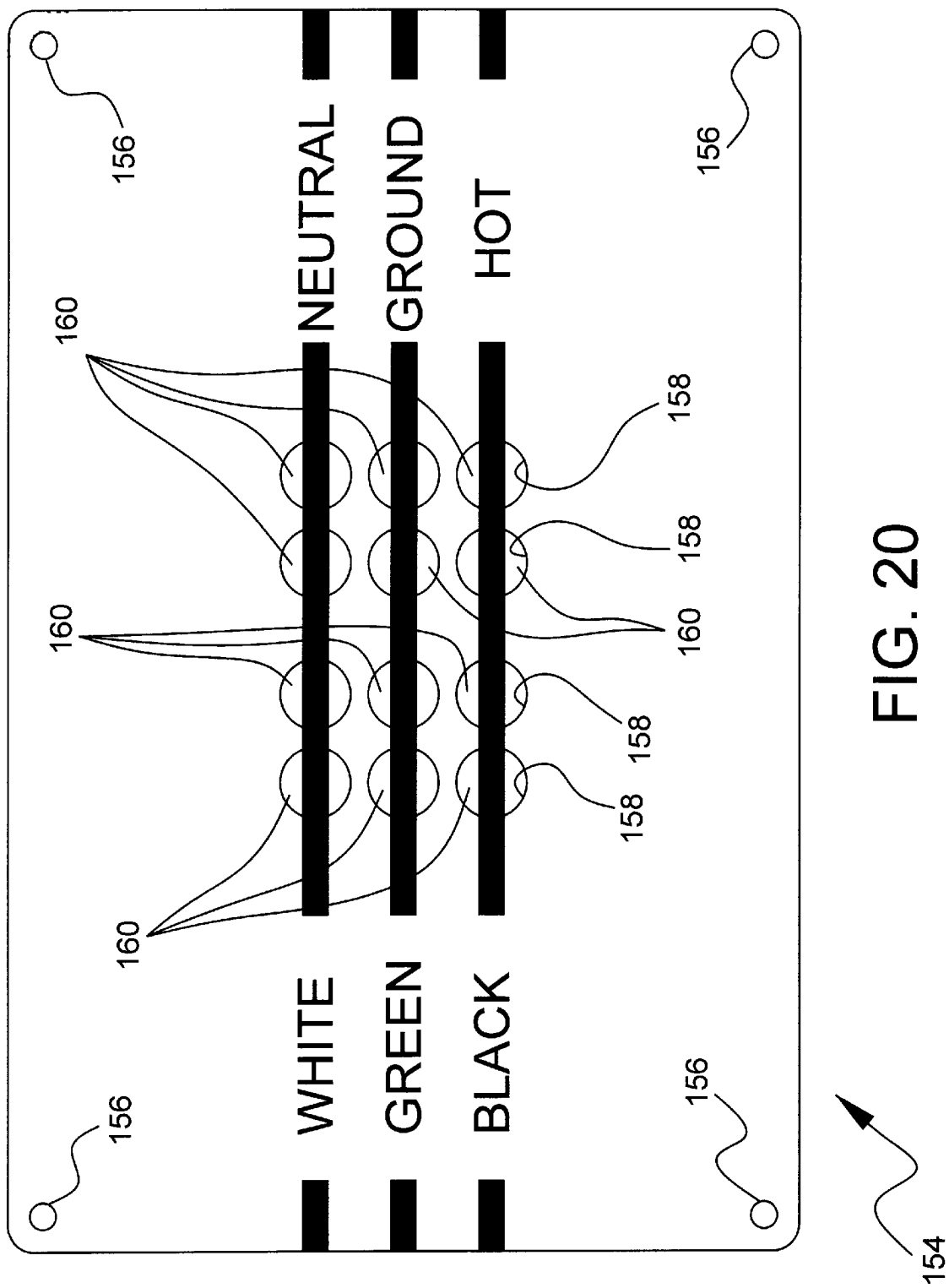
FIG. 20 is a top plan view of an optional cover plate for use with the first embodiment of the electrical interconnection system according to the present invention.
Figure 21:
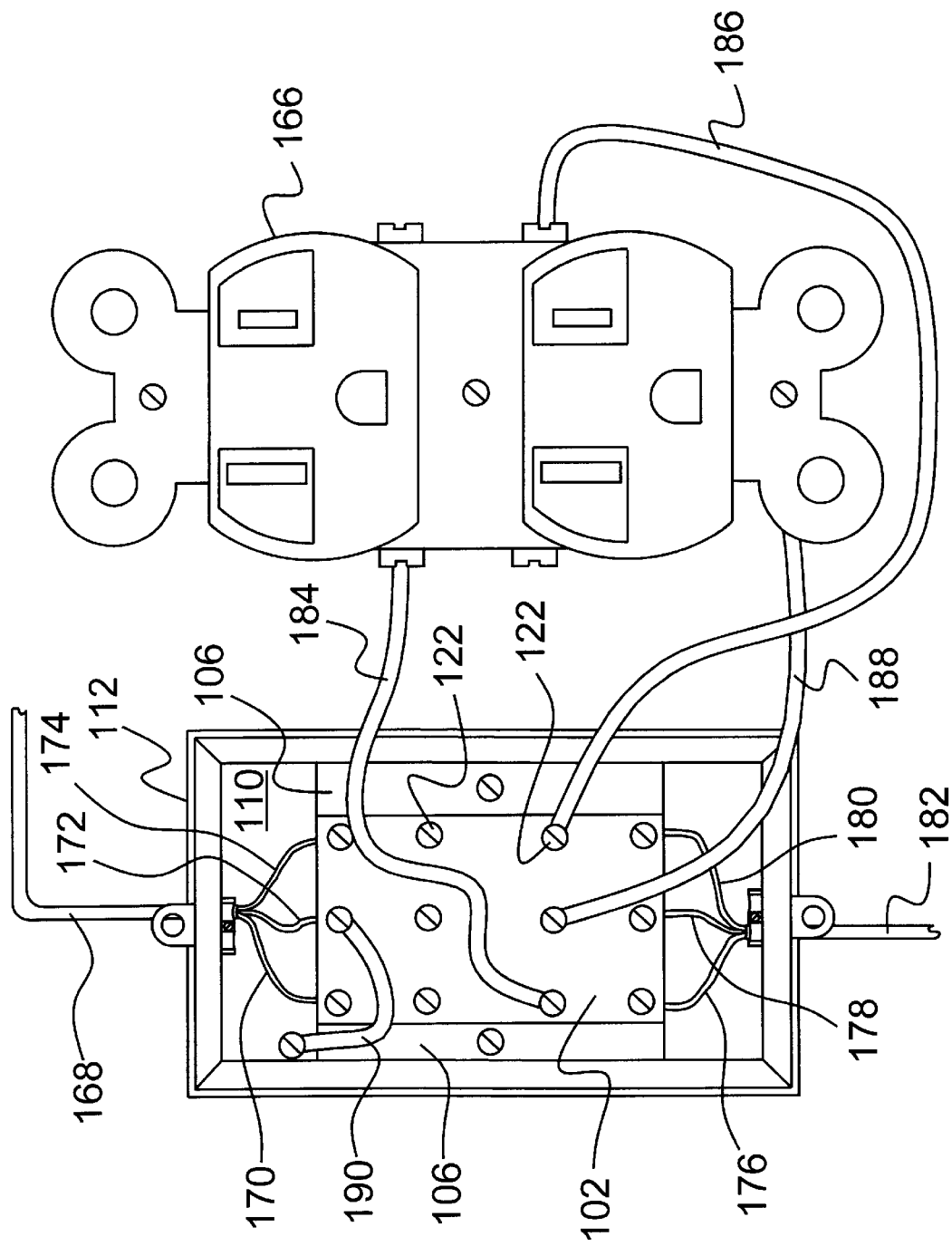
FIG. 21 is an environmental view showing the first embodiment of an electrical interconnection system according to the present invention applied to a middle-of-circuit receptacle.

Referring to FIG. 21, the installation of the wiring system 100 is illustrated with respect to providing electrical connections to a receptacle. The box 112 is ordinarily nailed to a wall stud and is accessible through an opening in the drywall panel. The receptacle 166 is connected in parallel to the other loads that draw current from the supply cable 168, therefore it is not necessary to route all the current in the hot wire 170 through the receptacle 166. Therefore, all the buss bars used in the receptacle application are of the longer variety 116. The box 112 is usually provided with openings that allow the ends of the building wiring cables 168 and 182 to be placed inside the box 112. The individual wires in the standard multi-wire cables 168 and 182 are then separated and the insulation of each wire is stripped for a distance of approximately 0.75 inches. The exposed end of each of the incoming hot, ground, and neutral wires, 170, 172 and 174, respectively, is then inserted into one end of the axial passage 118 of the particular buss 116 that corresponds to that particular wire. The individual wires are then firmly secured to the respective buss 116 by two type 1 screws 122 to lock the wires in place and provide a sound electrical connection with the respective buss 116. Similarly, the exposed end of each of the outgoing hot, ground, and neutral wires, 176, 178 and 180, respectively, is inserted into the opposite end of the axial passage 118 of the corresponding buss bar 116. Again, the individual wires are then firmly secured to their respective busses 116 by two type 1 screws 122 to lock the wires in place and provide a sound electrical connection between each wire and its respective buss 116. With the incoming and the outgoing wires installed in the block, each of the hot, ground and neutral buss bars 116 and their respective incoming and outgoing wires will be configured as illustrated in FIG. 12. Thus the supply current carried by the cable 168 can pass through the receptacle box 112 uninterrupted. The insulating block 102 with wires 170, 172, 174, 176, 178, and 180 firmly seated therein is then attached to the box 112 using self-tapping screws inserted through the mounting holes 108. At this point in the installation process, the installer should substitute one type 2 screw 126 for one of the type 1 screws 122 in contact with the hot buss 116, one type 2 screw 126 for one of the type 1 screws 122 in contact with the neutral buss 116, and two type 2 screws 126 for two of the type 1 screws 122 in contact with the ground buss 116. The optional cover plate 154 can be installed at this time after the knockouts corresponding to the positions of the type 2 fasteners have been removed. The type 2 fastener in contact with the hot buss is then connected to the hot terminal of the receptacle 166 by the wire 184, the type 2 fastener in contact with the neutral buss is connected to the neutral terminal of the receptacle 166 by the wire 186, and one of the type 2 fasteners in contact with the ground buss is connected to the frame of the receptacle 166 by the wire 188. The second type 2 fastener in contact with the ground buss is connected to the box 112 using wire 190 in order to ground the box 112. The ends of the wires 184, 186, 188, and 190 that are in contact with the type 2 fasteners are provided with ring terminals 192 (see FIG. 23A). Each ring terminal 192 is secured to the type 2 fastener 126 using a type 1 fastener 122 as illustrated in FIGS. 14 and 15. Each of the wires 184, 186,188, and 190 is connected to at least one ring terminal 192 by having one of its ends stripped of insulation and then having the ring terminal crimped to the bare wire. The wires 184, 186, 188, and 190 are connected to the receptacle 166 and the box 112 in the conventional manner. With the wires 184,186,188, and 190 connected to their respective type 2 fasteners the internal arrangement of the block 102 will resemble the arrangement shown in FIG. 15 (only one ground contact being shown). The internal conductive connections for the ground buss will be essentially as shown in FIG. 14. The internal conductive connections for the hot and neutral busses will also resemble that shown in FIG. 14 except that a type 1 fastener 122 will take the place of one of the type 2 fasteners 126. The receptacle 166 can then be secured to the box 112 in the conventional manner and a decorative face plate can be placed over the opening in the wall for the receptacle 166 to complete the installation.

Figure 10:
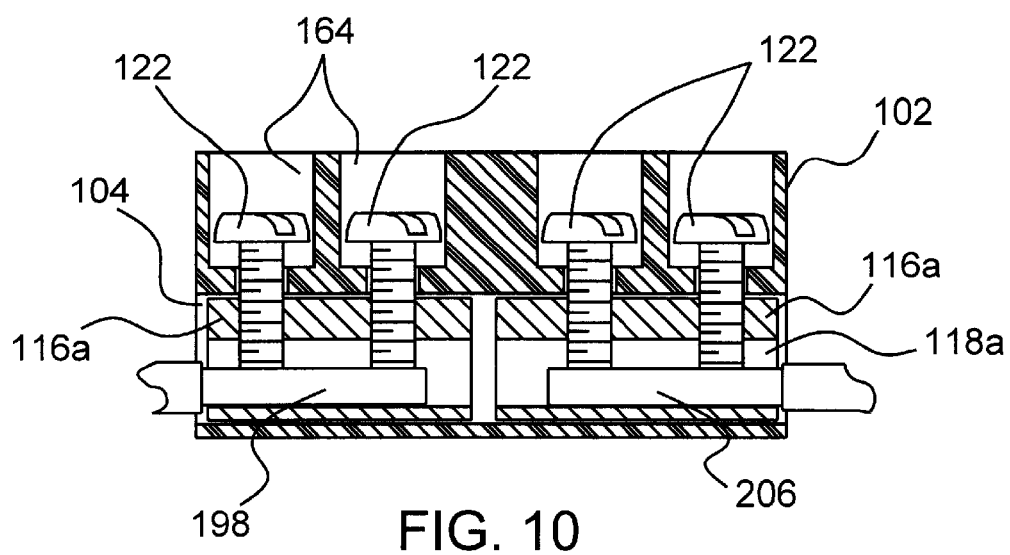
FIG. 10 is a cross sectional view showing short buss bars positioned within the insulating block of the first embodiment of the electrical interconnection system according to the present invention.
Figure 13:
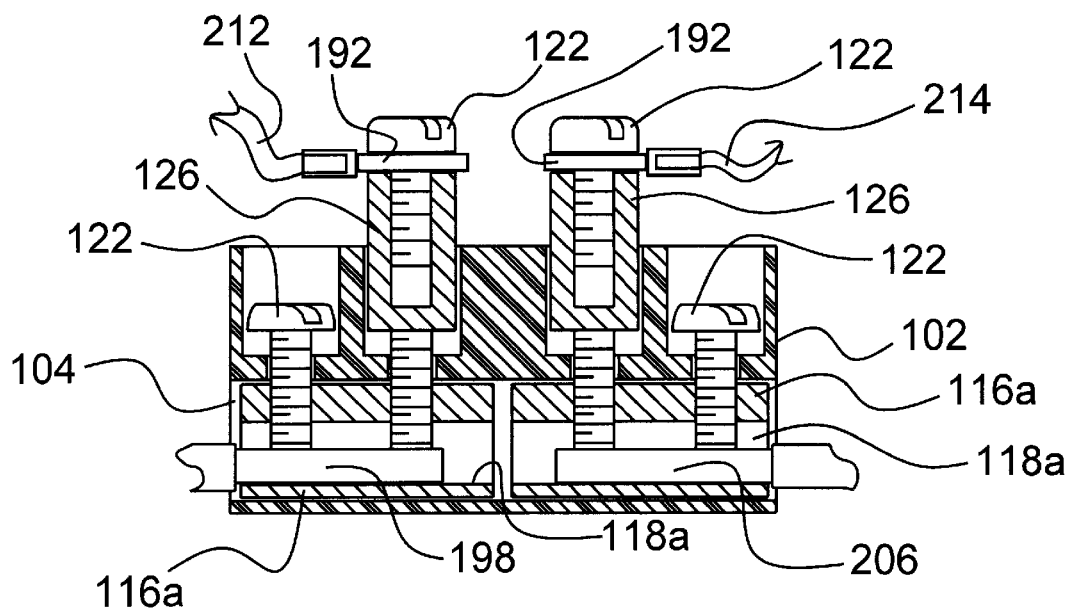
FIG. 13 is a cross sectional view showing short buss bars positioned within the insulating block of the first embodiment of the electrical interconnection system according to the present invention together with connections to other circuit components.

Referring to FIGS. 22A and 22B, the installation of the wiring system 100 is illustrated with respect to providing electrical connections to a switch 194. The box 112 is ordinarily nailed to a wall stud and is accessible through an opening in the drywall panel. The switch 194 is connected in series with the light fixture 196 so that it can selectively interrupt or permit the flow of current to the light fixture, therefore it is necessary to route all the current in the hot wire 198 through the switch 194. Therefore, the neutral and ground buss bars used in the switch application are of the longer variety 116 and the hot wire buss bars (two will be placed in the same passage 104) will be of the short variety 116a. The box 112 is usually provided with openings that allow the ends of the building wiring cable 168 and the cable 200, connecting the box 112 to the lighting fixture 196, to be placed inside the box 112. The individual wires in the standard multi-wire cables 168 and 200 are then separated and the insulation of each wire is stripped for a distance of approximately 0.75 inches. The exposed end of each of the incoming ground and neutral wires, 202 and 204, respectively, is then inserted into one end of the axial passage 118 of the particular buss bar 116 that corresponds to that particular wire. The exposed end of the incoming hot wire 198 is inserted into the axial passage 118a of the first short buss bar 116a. The individual wires are then firmly secured to the respective buss 116 or 116a by two type 1 screws 122 to lock the wires in place and provide a sound electrical connection with the respective buss 116 or 116a. With respect to the outgoing ground and neutral wires, 208 and 210, respectively, the exposed end of each of the outgoing ground and neutral wires is inserted into the opposite end of the axial passage 118 of the corresponding buss bar 116. The exposed end of the outgoing hot wire 206 is inserted into the axial passage 118a of the second short buss bar 116a. The air gap or insulating spacer between the buss bars 116a prevents any direct current flow from the incoming hot wire 198 to the outgoing hot wire 206. Again, the individual wires are then firmly secured to their respective busses 116 by two type 1 screws 122 to lock the wires in place and provide a sound electrical connection between each wire and its respective buss 116 or 116a. With the incoming and the outgoing wires installed in the block, each of the ground and neutral buss bars 116 and their respective incoming and outgoing wires will be configured as illustrated in FIG. 12. The hot buss bars 116a and their respective incoming and outgoing wires will be configured as illustrated in FIGS. 10 or 11 depending on whether or not an insulating spacer is used. The insulating block 102 with wires 198, 202, 204, 206, 208, and 210 firmly seated therein is then attached to the box 112 using self-tapping screws inserted through the mounting holes 108. At this point in the installation process, the installer should substitute one type 2 screw 126 for one of the type 1 screws 122 in contact with the ground buss 116, one type 2 screw 126 for one of the type 1 screws 122 in contact with the first hot buss 116a, and one type 2 screw 126 for one of the type 1 screws 122 in contact with the second hot buss 116a. The optional cover plate 154 can be installed at this time after the knockouts corresponding to the positions of the type 2 fasteners have been removed. Then, the type 2 fastener in contact with the first hot buss 116a is connected to one terminal of the switch 194 by the wire 212, the type 2 fastener in contact with the second hot buss 116a is connected to another terminal of the switch 194 by the wire 214, and the type 2 fastener in contact with the ground buss 116 is connected to the box 112 using wire 216 in order to ground the box 112. The ends of the wires 212, 214, and 216 that are in contact with the type 2 fasteners are provided with ring terminals 192 (see FIG. 23A). Each ring terminal 192 is secured to the type 2 fastener 126 using a type 1 fastener 122 as illustrated in FIGS. 13 and 14. Each of the wires 212, 214, and 216 is connected to at least one ring terminal 192 by having one of its ends stripped of insulation and then having the ring terminal crimped to the bare wire. The wires 212, 214, and 216 are connected to the switch 194 and the box 112 in the conventional manner. With the wires 212, 214, and 216 connected to their respective type 2 fasteners the internal arrangement of the block 102 will resemble the arrangement shown in FIG. 13 with respect to the hot busses 116a, the internal conductive connections for the ground buss 116 will resemble that shown in FIG. 14 except that a type 1 fastener 122 will take the place of one of the type 2 fasteners 126, and the internal conductive connections for the neutral buss 116 will be the same as that shown in FIG. 12. The switch 194 can then be secured to the box 112 in the conventional manner and then a decorative face plate can be placed over the opening in the wall for the switch 194 to complete the installation. When the switch 194 is turned on, current will flow to the light fixture 196 via the hot wire 206 and will return via the neutral wire 210 to thereby complete the circuit between the supply cable 168 and the light fixture 196 and cause the light fixture 196 to emit light.

With the wiring system 100, the user has a choice as to the location of the type 2 fastener for each of the hot, ground and neutral wire connections. Also multiple connections can be made to the same type 2 fastener allowing multiple connections of gangs of wires to the buss bars in block 102. Thus, the wiring system 100 provides a great degree of flexibility and safety in making connections. Also, because multiple connections can be made to each type 2 fastener, the number of type 2 fasteners required for a particular application can be reduced as long as the maximum safe current rating for each type 2 fastener is not exceeded. For example, only one type 2 fastener 126 could have been placed in contact with the ground buss in the receptacle example and both wires 188 and 190 could have been connected to that one type 2 fastener 126. Thus with the wiring system 100 only one type 2 screw 126 is needed in each buss to connect receptacles, lighting fixtures, fans, and the like to the building's power supply wiring. For a switch installation, two type 2 screws 126 would have to be used, one being in contact with each of the short buss bars 116a. In the wiring system 100 the type 2 screws 126 must be firmly screwed into the busses to assure a positive electrical connection. This can be accomplished by a driver tool such as a screwdriver in the case of the type 2 fasteners 126, which have a screwdriver slot 142 at the top. An Allen wrench would be used for the type 2 fasteners 124 that have a recess for engagement by the Allen wrench. The connections of wires such as wires 184, 186, 188, and 190 to type 2 fasteners can be protected by insulating caps to reduce the possibility of short circuits. The insulating caps could have a small hole for an instrument probe so that an ohmmeter can be used to check that the connections are proper. The spacing between the holes 114 in the block 102 should also be selected so as to reduce the possibility of short circuits. In fact, the large diameter portions 164 of the holes 114 can be extended upward such that the type 2 fasteners are isolated from one another by the material of the block 102. These extended large diameter portions of the holes 114 can be provided with open ended slots that face away from the other holes 114 to allow the passage of wires such as wires 184, 186, 188, and 190 into the large diameter portions 164 of the holes 114. Also note that the head portions of the fasteners 126 can be made shorter than illustrated in the drawings so that it will be easier for the fastener 126 to be completely received within extended large diameter portions 164 of the holes 114.

The wiring system 100 can be made in a variety of sizes depending upon the particular application. Further, the wiring system of the present invention may be designed with any number of buss bar passages and the buss bars can have any number of threaded holes depending upon the particular application for which the wiring system is designed.

Referring to FIGS. 24–36B, a second embodiment 300 of the wiring system according to the invention can be seen. The embodiment 300 includes a base 302 and sidewalls 304. The base 302 is made of an insulating material such as plastic. The walls 304 are usually made of sheet metal. In the illustrated example, the base 302 and the walls 304 cooperatively form the electrical box 306 with the base 302 serving as the bottom of the box. However, it is also possible to provide the base 302 as a separate piece that can be mounted to the bottom of the box in the same manner as was done with the block 102. Similarly, the block 102 can also be made an integral part of the electrical box. The box 306 is usually mounted to wall studs (not shown) by nails 308. The box 306 also has an open top 310 that registers with a matching opening in the drywall panel 314. The top opening 310 allows access to the interior of the box 306. The box 306 also has a pair of threaded bores 312 on either side of the top opening 310. Setscrews 316 are placed in the threaded bores 312. The setscrews 316 lack a head portion with a larger diameter relative to the screw shaft and therefore the screws 316 can pass entirely into the threaded bores 312. The setscrews 316 can be tightened or loosened by an Allen wrench or the like inserted into the top end of the threaded bores 312. Each setscrew 316 impinges on the end portion of a rocker arm 318. The other end of each rocker arm 318 presses against the back surface of the drywall 314. Tightening the setscrews 316 more firmly presses the rocker arms 318 against the drywall 314 such that the box 306 is more firmly held in position by the cooperation between the nails 308 and the rocker arms 318. The threaded bores 312 also serve to receive the mounting screws 320 for the decorative faceplate 322. The box 306 has holes 321 and 323 to allow passage of multi-conductor cables 340 and 342 into the interior of the box 306.

The wiring system 300 also includes an array of fastener supports that in the illustrative example of FIGS. 24–27 and 35 are bushings 324 that have upright threaded posts 326. The bushings 324 have roughly cylindrical bases 328 that are embedded in the insulating base 302 such that the posts 326 project substantially perpendicularly from the bottom of the box 306. The bushings 324 are preferably made of an electrically conductive material such as metals including brass. The bushings 324 are designed to be firmly attached to the base 302 such that they cannot be rotated or become loose. The bushings 324 have axial serration 330 about the periphery thereof. Each serration 330 extends substantially parallel to the longitudinal axis of the bushing base 328. When the base 328 is embedded in the insulating base 302, the serration 330 help the bushings 324 resist turning relative to the base 302 due to the torque that is applied to the bushings 324 during the installation process.

The base 302 is divided into a plurality of regions by divider barriers or partitions 332 as seen in plan view. The partitions 332 project substantially perpendicularly from the base 302. The partitions 332 are made of insulating material such as plastic and may be formed integrally with the base 302 as in the illustrated example. As an example, the base 302 and the partitions 332 can be molded together as one piece. The partitions 332 are approximately % inch to one inch high. The partitions 332 help prevent short circuits between exposed wires in adjacent regions defined by the partitions 332. Some of the regions defined by the partitions 332, denoted by reference numeral 334, are provided with only one bushing 324. Other regions 336 are provided with two bushings 324. The bushings 324 are arranged in a staggered pattern as seen in plan view so that there will be ample room for manipulating the various wires and fasteners during the installation process.

Cables 340 and 342 pass into the box 306 as shown in FIGS. 25–27. For illustrative purposes the cable 342 is the incoming cable and the cable 340 is the outgoing cable. Cable 342 includes the hot wire 344, the ground wire 346, and the neutral wire 348. Cable 340 includes the hot wire 350, the ground wire 352, the neutral wire 354, and the spare wire 356. In the illustrated example, the cable 342 is of the three-conductor type while the cable 340 is of the four-conductor type. This example illustrates how the wiring system 300 can be used to connect three-conductor and four conductor circuits together. The cables 342 and 340 could of course have both been of the three-conductor or four-conductor varieties without affecting the principle of operation of the wiring system 300. In a three-conductor wiring system one of the regions 334 and its respective bushing 324 would be unused, or in switch applications one of the hot wires 344 and 350 could be connected to the bushing in the spare 334 region rather than to one of the bushings in the 336 region. In a four-conductor wiring system both spare wires would be connected to the same bushing 324 in the same region 334 in the manner illustrated for the ground and neutral wires. In the illustrated example, the one spare wire 356 is secured to the bushing post in the spare 334 region by a type 1 fastener 358 so that it will not inadvertently touch the other wires and short them out. In the illustrated example, a type 1 fastener would be a conventional flat nut.

The wiring system 300 also includes type 2 fasteners that are illustrated in FIGS. 29A to 30B. These fasteners are considered type 2, also referred to herein as fasteners of the second type, in the sense that they provide for the connection of wires from various other circuit components to the wires of the cables 340 and 342. The first example of a type 2 fastener for use with the wiring system 300 is the fastener 360 shown in FIGS. 29A and 29B. The fastener 360 is roughly in the form of a hexagonal sleeve with a threaded bore 362. In use, one end of the bore 362 engages the post 326 of one of the bushings 324 while the other end of the bore 362 receives a screw 368 for connecting one or more wires having ring terminals 192 to the fastener 360. The fastener 360 can be tightened or loosened using an ordinary hexagonal nutdriver. The second example of a type 2 fastener for use with the wiring system 300 is the fastener 364 shown in FIGS. 30A and 30B. The fastener 364 is roughly in the form of a cylindrical sleeve with a threaded bore 366. The fastener 364 is slotted at one end for engagement by a screwdriver. In use, one end of the bore 366 engages the post 326 of one of the bushings 324 while the other end of the bore 366 receives a screw 368 for connecting one or more wires having ring terminals 192 to the fastener 364. The fasteners 360 and 364 are made of an electrically conductive material and are preferably made of metal. It is of course possible to use type 2 fasteners to perform the function of the type 1 fasteners in both the illustrative embodiments of the present invention. Therefore, the wiring systems 100 and 300 could be supplied with only type 2 fasteners.

Referring to FIG. 27, the wiring system 300 is shown configured for connecting a switch such as switch 194. The ends of the wires 344, 346, 348, 350, 352, and 354 are first stripped of insulation. The ends of the neutral wires 348 and 354 are electrically connected by being secured by a type 1 fastener 358 to the bushing 324 designated for neutral wire connections. The wires 348 and 354 are secured to the corresponding bushing 324 by having their exposed ends clamped between the fastener 358 and the bushing 324. The ground wires 346 and 352 are electrically connected by having their exposed ends clamped between the corresponding fastener 360 and the bushing 324 designated for making ground wire connections. The incoming hot wire 344 is secured to the corresponding bushing 324 by having its exposed end clamped between the corresponding fastener 360 and the corresponding bushing 324 in the region 336. The outgoing hot wire 350 is secured to the corresponding bushing 324 by having its exposed end clamped between the corresponding fastener 360 and the corresponding bushing 324 in the region 336. The exposed ends of the incoming hot wire 344 and the outgoing hot wire 350 are short enough such that direct electrical contact between the incoming hot wire 344 and the outgoing hot wire 350 is avoided. The partitions 332 also help to prevent the exposed ends of the wires 344, 346, 348, 350, 352, and 354 from being dislodged from under each wire's corresponding fastener. It is also possible to provide the wires 344, 346, 348, 350, 352, and 354 with ring terminals to ensure that the wires will not be dislodged from under the corresponding fasteners.

The optional cover plate 370 can now be installed if desired. The optional cover plate 370 is made of an insulating material. The optional cover plate 370 has holes 372 covered by "knockouts" 374. The holes 372 are located relative to the cover plate 370 such that each of the holes 372 registers with a respective bushing 324 when the cover plate 370 is placed in the box 306 above the base 302. The cover plate 370 is securely mounted within the box 306 and over the base 302 using screws that pass through holes 376 in the cover plate and engage holes 378 in the base 302. The knockouts corresponding in location to the fasteners 360 are removed before the cover plate 370 is mounted inside the box 306. Each hole 372 is color coded and labeled with words as, for example, shown in FIG. 34.

To complete the installation of the switch 194, the wire 212 is connected to the fastener 360 that is in contact with hot wire 344. The end of the wire 212 is secured to the corresponding fastener 360 by placing the threaded shaft of a first screw 368 through the ring terminal at the end of the wire 212 and then threadably engaging the screw 368 to the fastener 360 that is in contact with the hot wire 344. In the illustrated example, the screw 368 has a knurled knob to allow a person to tighten the screw 368 using his or her fingers, although other types of screws can also be used for the same purpose. The wire 214 is connected to the fastener 360 that is in contact with hot wire 350 in a similar manner. The wire 190 is connected to the wall 304 of the box 306 and to the fastener 360 that is in contact with the ground wires 346 and 352, again using a screw of the same type as screw 368, to ground the metal parts of the box 306. The installation of the switch 194 can now be completed as was described previously. As an alternative to ring terminals, the wires such as wires 212, 214 and 190 can be provided with spade or U-shaped terminals.

Referring to FIG. 26, the wiring system 300 is shown configured for connecting a receptacle such as receptacle 166. The procedure for installing the receptacle is similar to that described for the switch 194 and only the important differences are noted below. In the receptacle configuration, or any time the hot wires 344 and 350 are to continue through the box 306 uninterrupted, the lengths of the exposed portions of at least one of the hot wires 344 and 350 should be increased such that at least one of the hot wires contacts both bushings 324 in the region 336 as illustrated in FIG. 26. Alternatively, both hot wires can be connected to the same bushing, or a length of wire with ring connectors at both ends can be supplied to connect the bushings in the region 336. At least one of the bushings in the region 336 should be provided with a type 2 fastener 360. Similarly, each of the bushings in contact with the ground wires and the neutral wires should be provided with a type 2 fastener 360. Knockouts 374 should be removed from the cover plate 370 in a pattern that matches the locations of the fasteners 360. The connections between the hot, neutral and ground terminals of the wires connected to the receptacle 166 and the respective type 2 fasteners 360 can then be made using screws 368. An additional ground connection is made to ground the box 306. Therefore, two ring terminals 192 will be connected to the ground fastener 360 using the screw 368 as illustrated in FIG. 35. The installation of the receptacle 166 can then be completed in the same manner as described in reference to wiring system 100.

Referring to FIGS. 31A and 31B, an alternative to bushing 324 can be seen. The bushing 380 differs from the bushing 324 in having a threaded bore 382 in place of the threaded post 326. Otherwise the bushing 380 is identical to bushing 324.

The first example of a type 2 fastener for use with the bushing 380 is the fastener 384 shown in FIGS. 32A and 32B. The fastener 384 is roughly in the form of a hexagonal sleeve with a threaded bore 386 that is closed off at the bottom. A threaded post 388 projects from the bottom of the sleeve portion of the fastener 384. In use, the post 388 engages the threaded bore of the bushing 380 while the bore 386 receives a screw 368 for connecting one or more wires having ring terminals 192 to the fastener 384. The fastener 384 can be tightened or loosened using an ordinary hexagonal nutdriver. The second example of a type 2 fastener for use with the bushing 380 is the fastener 390 shown in FIGS. 33A and 33B. The fastener 390 is roughly in the form of a cylindrical sleeve with a threaded bore 392 that is closed off at the bottom. A threaded post 394 projects from the bottom of the sleeve portion of the fastener 390. The fastener 390 is slotted at the top end for engagement by a screwdriver. In use, the post 394 engages the threaded bore of the bushing 380 while the bore 392 receives a screw 368 for connecting one or more wires having ring terminals 192 to the fastener 390.

Referring to FIGS. 36A and 36B, an alternative to bushing 324 can be seen. The bushing 396 differs from the bushing 324 in having a non-circular base in place of the serrated base 328 to resist rotation relative to the base 302. Otherwise the bushing 396 is identical to bushing 324 in having a threaded post 400 for attachment of fasteners 358, 360 and 364. The base 398 is roughly square shaped in the illustrated example; however, other non-circular shapes can also be used.

The wiring system 300 can be made with any number of the single bushing and double bushing regions and corresponding insulating partitions depending upon the particular application.

Referring to FIGS. 38–41, a fourth embodiment 500 of the wiring system according to the invention can be seen.

The embodiment 500 includes a base 502 that is adapted for installation to the bottom 503 of a junction box 501. The base 502 is made of an insulating material such as plastic. The base 502 is similar to the base 302, however, the base 502 is separate from the junction box 501 and can be mounted to the bottom of the junction box using screws 504 that pass through holes in the center partition 533 and engage threaded holes in the bottom of the junction box 501. The junction box 501 is similar to the box 306 except that the bottom 503 of the box 501 does not have an integrally formed wiring interconnection system and may be made of the same material as the walls 304. It should be noted here that the base 502 can be used with any type of electrical box including a box such as the junction box 112.

The wiring system 500 includes an array of fastener supports that in the illustrative example of FIGS. 38–41 are bushings 524 that have upright threaded posts 526. The bushings 524 have roughly cylindrical bases 528 that are embedded in the insulating base 502 such that the posts 526 project substantially perpendicularly from the base 502. The threaded posts 526 are relatively long and project farther than the height of the partitions 532 and 533. The bushings 524 are preferably made of an electrically conductive material such as metals including brass. The bushings 524 are designed to be firmly attached to the base 502 such that they cannot be rotated or become loose. The bushings 524 have axial serration 530 about the periphery thereof. Each serration 530 extends substantially parallel to the longitudinal axis of the bushing base 528. When the base 528 is embedded in the insulating base 502, the serration 530 help the bushings 524 resist turning relative to the base 502 due to the torque that is applied to the bushings 524 during the installation process.

The base 502 is divided into a plurality of regions by divider barriers or partitions 532 and 533 as seen in plan view. The partitions 532, 533 project substantially perpendicularly from the base 502. The partitions 532, 533 are made of insulating material such as plastic and may be formed integrally with the base 502 as in the illustrated example. As an example, the base 502 and the partitions 532, 533 can be molded together as one piece. The partitions 532, 533 are approximately ¼ inch to one inch high. The partitions 532, 533 help prevent short circuits between exposed wires in adjacent regions defined by the partitions 532, 533. Some of the regions defined by the partitions 532, 533, denoted by reference numeral 534, are provided with only one bushing 524. Other regions 536 are provided with two bushings 524. The bushings 524 are arranged in a staggered pattern as seen in plan view so that there will be ample room for manipulating the various wires and fasteners during the installation process.

Cables 340 and 342 pass into the box 501 as shown in FIG. 39. For illustrative purposes the cable 342 is the incoming cable and the cable 340 is the outgoing cable. Cable 342 includes the hot wire 344, the ground wire 346, and the neutral wire 348. Cable 340 includes the hot wire 350, the ground wire 352, the neutral wire 354, and the spare wire 356. In the illustrated example, the cable 342 is of the three-conductor type while the cable 340 is of the four-conductor type. This example illustrates how the wiring system 500 can be used to connect three-conductor and four conductor circuits together. The cables 342 and 340 could of course have both been of the three-conductor or four-conductor varieties without affecting the principle of operation of the wiring system 500. In a three-conductor wiring system one of the regions 534 and its respective bushing 524 would be unused, or in switch applications one of the hot wires 344 and 350 could be connected to the bushing in the spare single bushing region 534 rather than to one of the bushings in the two bushing region 536. In a four-conductor wiring system both spare wires would be connected to the same bushing 524 in the same region 534 in the manner illustrated for the ground and neutral wires. In the illustrated example, the one spare wire 356 is secured to the bushing post in the spare 534 region by a type 1 fastener 358 (see FIG. 26) so that it will not inadvertently touch the other wires and short them out. In the illustrated example of FIGS. 38–41, a conventional flat nut could serve as the type 1 fastener. In addition, the type 2 fastener 560 can be used for the same purpose.

The wiring system 500 includes type 2 fasteners 560 that are illustrated in FIGS. 39 and 41. These fasteners are considered type 2, also referred to herein as fasteners of the second type, in the sense that they provide at least in part for the electrical connection of wires from various other circuit components to the wires of the cables 340 and 342. The fasteners 560 are essentially identical to the fasteners 360 except that the fasteners 560 have a substantially annular flange 561 near the bottom thereof that provides an enlarged bearing surface for securing the exposed ends of wires such as wires 344, 346, 348, 350, 352, 354, and 356. The fastener 560 is roughly in the form of a hexagonal sleeve with a threaded bore. The fastener 560 is preferably long enough such that its upper end is coplanar or at least projects slightly beyond the top surface of the optional cover plate 570. Thus, the upper end of the fastener 560 provides a supporting or bearing surface for ring terminals such as ring terminals 192 to ensure a positive electrical connection between the ring terminals and wires such as wires 344, 346, 348, 350, 352, 354, and 356. Because of the length of the posts 526, the posts 526 pass completely through the threaded bore of the fasteners 560 when the fasteners 560 are tightened down to secure in place exposed ends of wires such as wires 344, 346, 348, 350, 352, 354, and 356. The ends of the posts 526 that project from the upper ends of the fasteners 560 can then receive ring terminals 192 around them. The ends of the posts 526 that project from the upper ends of the fasteners 560 can also receive caps 568 to secure the ring terminals in place and thus connect one or more wires having ring terminals 192 to hot, neutral, ground, or spare wires as the case may be. The fasteners 560, 364, and 360 can be used interchangeably.

Referring to FIG. 39, the wiring system 500 is shown configured for connecting a receptacle such as receptacle 166. The ends of the wires 344, 346, 348, 350, 352, 354, and 356 are first stripped of insulation. The ends of the neutral wires 348 and 354 are electrically connected by being secured by a fastener 560 to the bushing 524 designated for neutral wire connections. The wires 348 and 354 are secured to the corresponding bushing 524 by having their exposed ends clamped between the fastener 560 and the bushing 524. The ground wires 346 and 352 are electrically connected by having their exposed ends clamped between the corresponding fastener 560 and the bushing 524 designated for making ground wire connections. Exposed ends of the hot wires 344 and 350 are secured to the bushings 524 in the region 536 as illustrated in FIG. 39 using fasteners 358 or 560. At least one of the fasteners used to secure the hot wires 344 and 350 should be a fastener 560. In the illustrated example of FIG. 39 both fasteners used to secure the hot wires 344 and 350 are fasteners 560.

The optional cover plate 570 can now be installed if desired. The optional cover plate 570 is made of an insulating material. The optional cover plate 570 has holes 572 covered by "knockouts" 574. The holes 572 are located relative to the cover plate 570 such that each of the holes 572 registers with a respective bushing 524 when the cover plate 570 is placed in the box 501 above the base 502. The cover plate 570 is securely mounted within the box 501 and over the base 502 using a screw that passes through the hole 576 in the cover plate and engages hole 578 in the center partition of the base 502. Because of the heights of the posts 526 all the knockouts 574 corresponding in location to the fastener supports 524 must be removed before the cover plate 570 is mounted inside the box 501. Each hole 572 is color coded and labeled with words as, for example, shown in FIG. 40.

To complete the installation of the receptacle 166, the wire 184 is connected to the fastener 560 that is in contact with hot wire 344 or 350. The end of the wire 184 is secured to the corresponding fastener 560 by placing the ring terminal at the end of the wire 184 around the corresponding post 526 and fastening a cap 568 to the corresponding post 526 over the ring terminal attached to the wire 184. The cap 568 is of the type that can be tightened by hand. The cap 568 is frusto-conical and has a knurled or serrated external surface to afford the user a good grip. The cap 568 is largely made of an insulating material and has a central metallic, threaded sleeve that is matingly engageable to the posts 526. The central sleeve of the cap 568 may be provided with a top opening adapted to receive a circuit tester probe. The wire 186 is connected to the fastener 560 that is in contact with the neutral wires 348 and 354 in a similar manner. The wire 190 is connected at one end to the wall of the box 501 and the wire 188 is connected at one end to the frame of the receptacle 166. Ring terminals 192 at the free ends of the wires 190 and 188 are then connected to the fastener 560 that is in contact with the ground wires 346 and 352, again using a cap 568, as shown in FIG. 41. The installation of the receptacle 166 can now be completed as was described previously.

The wiring system 500 can be made with any number of the single bushing and double bushing regions and corresponding insulating partitions depending upon the particular application.

Referring to FIG. 42, a further alternative embodiment of the present invention can be seen. The embodiment of FIG. 42 is generally similar to the embodiment of FIG. 35 except that an alternative combination of fastener supports and type 2 fasteners are used in the embodiment of FIG. 42. The embodiment of FIG. 42 uses fastener supports 324 and type 2 fasteners 684. Type 2 fasteners 684 are essentially identical to the fasteners 384 except that the fasteners 684 have a substantially annular flange 685 near the end where the opening to the threaded bore of the fastener 684 is located. The flange 685 provides an enlarged bearing surface for securing the exposed ends of wires such as wires 344, 346, 348, 350, 352, 354, and 356. The fastener 684 is roughly in the form of a hexagonal sleeve with a threaded bore 686 that is closed off at one end. A threaded post 688 projects from the closed end of the sleeve portion of the fastener 684. In use the bore 686 engages the post 326 of the fastener support 324 to secure the exposed ends of wires such as wires 344, 346, 348, 350, 352, 354, and 356 to the fastener support 324, and the post 688 is threadedly engaged by a cap 568 for connecting one or more wires having ring terminals 192 to the fastener 684. The fasteners 684 and 384 can be used interchangeably assuming the threaded posts 388 and 688 are both sufficiently long.

Referring to FIG. 37, yet another example of a type 2 fastener 784 for use with the bushing 380 can be seen. Type 2 fasteners 784 are essentially identical to the fasteners 384 except that the fasteners 784 have a substantially annular flange 785 near the end from which the threaded post 788 projects. The flange 785 provides an enlarged bearing surface for securing the exposed ends of wires such as wires 344, 346, 348, 350, 352, 354, and 356. The fastener 784 is roughly in the form of a hexagonal sleeve with a threaded bore 786 that is closed off at one end. A threaded post 788 projects from the closed end of the sleeve portion of the fastener 784. In use the post 788 engages the fastener support 380 to secure the exposed ends of wires such as wires 344, 346, 348, 350, 352, 354, and 356 to the fastener support 380, and the bore 786 is threadedly engaged by a screw 368 for connecting one or more wires having ring terminals 192 to the fastener 784. The fasteners 784, 390, and 384 can be used interchangeably.

The base portions of all the fastener supports disclosed herein may be provided with a tapering configuration such that illustrated in FIG. 43. Fastener support 824 is an example of a fastener support having a tapering base portion 828. The base portion 828 is wider at the bottom than at the top. A similar taper can be applied to all the fastener supports disclosed herein including fastener supports 380, 396, and 524.

In addition to all the type 2 fasteners disclosed herein, a type 2 fastener having a hexagonal cross section body and having threaded posts projecting from each end thereof may also be suitable for use, for example, in conjunction with the fastener support 380 and the cap 568.

All the fastener supports 824, 324, 380, 396, and 524, and their corresponding type 2 fasteners, are equally well suited for application to a base of the same type as the base 302 or to a base of the same type as the base 502.

It is envisioned that when these type 2 screws are prevalent in the marketplace, all outlets, switches, lights, fans, etc., will be pre-wired for quick connectors compatible with these type 2 screws. In the meantime color coded, flexible, preformed wires with snap-on terminals and/or quick connect screw connectors will be made available in convenient lengths, to connect the type 2 screws to the outlet, switch, light, fan, etc. The advantages of this wiring system are a quicker and safer installation and a neater, shallower junction box.

The wiring systems of the present invention have the advantages of eliminating clutter from inside junction boxes, allowing junction boxes to be made with less depth so as to make the junction boxes easier to work in, making installation easy and foolproof, saving time and labor costs, and providing strong, positive connections between conductors. The wiring systems of the present invention are easily adapted to octagonal or other odd shaped boxes by providing appropriately shaped insulating blocks and/or cover plates.

It is to be understood that the present invention is not limited to the embodiments disclosed above, but includes any and all embodiments within the scope of the appended claims. Furthermore, it is to be understood that the embodiments of the present invention disclosed above are susceptible to various modifications, changes and adaptations by those skilled in the art, and that such modifications, changes and adaptations are to be considered within the spirit and scope of the invention.

I claim:

1. A wiring interconnection system for use in a wiring system having cables with a plurality of conductors, the wiring interconnection system comprising:

an insulating block having a plurality of passages therethrough, each of said plurality of passages having a respective set of transverse openings in communication therewith;

a plurality of buss bars, each of said plurality of buss bars being conductive and having a plurality of threaded holes such that each of said plurality of buss bars can be placed within a respective one of said plurality of passages with said threaded holes thereof in registry with respective ones of said set of transverse openings of said respective one of said plurality of passages;

a plurality of fasteners supported in a predetermined array, each of said plurality of fasteners engaging a respective one of said plurality of threaded holes in a respective one of the plurality of buss bars, each of said plurality of fasteners being adapted to secure an exposed end of at least one of the plurality of conductors, each of said plurality of fasteners being in electrical communication with the at least one of the plurality of conductors when securing the at least one of the plurality of conductors; and a first length of wire having a first terminal attached at a first end of said first length of wire, at least one of said plurality of fasteners being of a second type adapted for engagement with said first terminal, said first length of wire being in electrical communication with at least one of the plurality of conductors when the at least one of the plurality of conductors is secured by said at least one of said plurality of fasteners that is of said second type and said first terminal is engaged to said at least one of said plurality of fasteners that is of a second type.

2. The wiring interconnection system according to claim 1, wherein the plurality of conductors are a first plurality of conductors of an incoming cable and the wiring system further includes an outgoing cable having a second plurality of conductors, the wiring interconnect system further comprising a housing adapted for mounting to a part of a building structure, said housing being adapted to receive end portions of the first and second pluralities of conductors, said plurality of fasteners being housed within said housing.

3. The wiring interconnection system according to claim 2, wherein said first length of wire has a second end adapted to be electrically connected to an electrical component selected from the group consisting of a switch, a receptacle, a light fixture, and a fan.

4. The wiring interconnection system according to claim 2, wherein said first length of wire is electrically connected to a branch circuit.

5. The wiring interconnection system according to claim 2, wherein the first plurality of conductors includes a first hot wire and a first neutral wire, the second plurality of conductors includes a second hot wire and a second neutral wire, wherein said plurality of fasteners includes at least first and second fasteners of said second type, the wiring interconnection system further comprising:

a second length of wire having a first end with a second terminal attached thereto, said second terminal being adapted for engagement with fasteners of said second type, wherein the first and second hot wires can be placed in electrical communication with said first fastener of said second type and the first and second neutral wires can be placed in electrical communication with said second fastener of said second type, and said first terminal can be engaged to said first fastener of said second type and said second terminal can be engaged to said second fastener of said second type to thereby electrically connect a branch circuit to the wiring system via said first and second lengths of wire.

6. The wiring interconnection system according to claim 2, wherein the first plurality of conductors includes a first hot wire and a first neutral wire, the second plurality of conductors includes a second hot wire and a second neutral wire, wherein said plurality of fasteners includes at least first and second fasteners of said second type, the wiring interconnection system further comprising:

a second length of wire having a first end with a second terminal attached thereto, said second terminal being adapted for engagement with fasteners of said second type, wherein the first and second hot wires can be placed in electrical communication with said first fastener of said second type and the first and second neutral wires can be placed in electrical communication with said second fastener of said second type, and said first terminal can be engaged to said first fastener of said second type and said second terminal can be engaged to said second fastener of said second type to thereby electrically connect an electrical component to the wiring system via said first and second lengths of wire.

7. The wiring interconnection system according to claim 6, wherein the electrical component is a receptacle.

8. The wiring interconnection system according to claim 2, wherein the first plurality of conductors includes a first hot wire and a first neutral wire, the second plurality of conductors includes a second hot wire and a second neutral wire, wherein said plurality of fasteners includes at least first and second fasteners of said second type, the wiring interconnection system further comprising:

a second length of wire having a first end with a second terminal attached thereto, said second terminal being adapted for engagement with fasteners of said second type, wherein the first hot wire can be placed in electrical communication with said first fastener of said second type and the second hot wire can be placed in electrical communication with said second fastener of said second type, and said first terminal can be engaged to said first fastener of said second type and said second terminal can be engaged to said second fastener of said second type to thereby electrically connect an electrical component to the wiring system via said first and second lengths of wire.

9. The wiring interconnection system according to claim 8 wherein the electrical component is a switch.

10. The wiring interconnection system according to claim 2, wherein each of said plurality of buss bars has a length and a longitudinal bore extending through the length thereof, each of said plurality of threaded holes being in communication with said longitudinal bore of a respective one of said plurality of buss bars.

11. The wiring interconnection system according to claim 10, wherein the first plurality of conductors includes a first hot wire and a first neutral wire, the second plurality of conductors includes a second hot wire and a second neutral wire, wherein said plurality of fasteners includes at least first, second, third, and fourth fasteners, the wiring interconnection system further comprising:

a second length of wire having a first end with a second terminal attached thereto, said second terminal being adapted for engagement with fasteners of said second type, wherein an exposed end portion of the first hot wire can be inserted into said bore of a first one of said plurality of buss bars through a first end of said first one of said plurality of buss bars, said exposed end portion of said first hot wire can be secured within said bore of said first one of said plurality of buss bars using at least said first fastener, an exposed end portion of the second hot wire can be inserted into said bore of said first one of said plurality of buss bars through a second end of said first one of said plurality of buss bars, said exposed end portion of said second hot wire can be secured within said bore of said first one of said plurality of buss bars using at least said second fastener, one of said first and second fasteners being of said second type, an exposed end portion of the first neutral wire can be inserted into said bore of a second one of said plurality of buss bars through a first end of said second one of said plurality of buss bars, said exposed end portion of said first neutral wire can be secured within said bore of said second one of said plurality of buss bars using at least said third fastener, an exposed end portion of the second neutral wire can be inserted into said bore of said second one of said plurality of buss bars through a second end of said second one of said plurality of buss bars, said exposed end portion of said second neutral wire can be secured within said bore of said second one of said plurality of buss bars using at least said fourth fastener, one of said third and fourth fasteners being of said second type, and said first terminal can be engaged to one of said first and second fasteners and said second terminal can be engaged to one of said third and fourth fasteners to thereby electrically connect an electrical component to the wiring system via said first and second lengths of wire.

12. The wiring interconnection system according to claim 10, wherein the first plurality of conductors includes a first hot wire and a first neutral wire, the second plurality of conductors includes a second hot wire and a second neutral wire, wherein said plurality of fasteners includes at least first, second, third, and fourth fasteners, the wiring interconnection system further comprising:

a second length of wire having a first end with a second terminal attached thereto, said second terminal being adapted for engagement with fasteners of said second type, wherein an exposed end portion of the first hot wire can be inserted into said bore of a first one of said plurality of buss bars through a first end of said first one of said plurality of buss bars, said exposed end portion of said first hot wire can be secured within said bore of said first one of said plurality of buss bars using at least said first fastener, an exposed end portion of the second hot wire can be inserted into said bore of said first one of said plurality of buss bars through a second end of said first one of said plurality of buss bars, said exposed end portion of said second hot wire can be secured within said bore of said first one of said plurality of buss bars using at least said second fastener, one of said first and second fasteners being of said second type, an exposed end portion of the first neutral wire can be inserted into said bore of a second one of said plurality of buss bars through a first end of said second one of said plurality of buss bars, said exposed end portion of said first neutral wire can be secured within said bore of said second one of said plurality of buss bars using at least said third fastener, an exposed end portion of the second neutral wire can be inserted into said bore of said second one of said plurality of buss bars through a second end of said second one of said plurality of buss bars, said exposed end portion of said second neutral wire can be secured within said bore of said second one of said plurality of buss bars using at least said fourth fastener, one of said third and fourth fasteners being of said second type, and said first terminal can be engaged to one of said first and second fasteners and said second terminal can be engaged to one of said third and fourth fasteners to thereby electrically connect a branch circuit to the wiring system via said first and second lengths of wire.

13. The wiring interconnection system according to claim 10, wherein the first plurality of conductors includes a first hot wire and a first neutral wire, the second plurality of conductors includes a second hot wire and a second neutral wire, wherein said plurality of fasteners includes at least first and second fasteners, and wherein said plurality of buss bars include short and long buss bars, said short buss bars being sized such that two of said short buss bars can be placed in a selected one of said plurality of passages without making conductive contact with one another, the wiring interconnection system further comprising:

a second length of wire having a first end with a second terminal attached thereto, said second terminal being adapted for engagement with fasteners of said second type, wherein an exposed end portion of the first hot wire can be inserted into said bore of a first short buss bar through a first end of said first short buss bar, said exposed end portion of said first hot wire can be secured within said bore of said first short buss bar using at least said first fastener, an exposed end portion of the second hot wire can be inserted into said bore of a second short buss bar through a first end of said second short buss bar, said exposed end portion of said second hot wire can be secured within said bore of said second short buss bar using at least said second fastener, both of said first and second fasteners being of said second type, and said first terminal can be engaged to one of said first and second fasteners and said second terminal can be engaged to another of said first and second fasteners to thereby electrically connect an electrical component to the wiring system via said first and second lengths of wire.

14. A wiring interconnection system for use in a wiring system having cables with a plurality of conductors, the wiring interconnection system comprising:

a plurality of fasteners supported in a predetermined array, each of said plurality of fasteners being adapted to secure an exposed end of at least one of the plurality of conductors, each of said plurality of fasteners being in electrical communication with the at least one of the plurality of conductors when securing the at least one of the plurality of conductors;

a first length of wire having a first terminal attached at a first end of said first length of wire, at least one of said plurality of fasteners being of a second type adapted for engagement with said first terminal, said first length of wire being in electrical communication with at least one of the plurality of conductors when the at least one of the plurality of conductors is secured by said at least one of said plurality of fasteners that is of said second type and said first terminal is engaged to said at least one of said plurality of fasteners that is of a second type;

a plurality of fastener supports each threadably engageable with any one of the plurality of fasteners; and an insulating base divided into a plurality of regions by a plurality of insulating partitions, each of said plurality of regions being provided with at least one of said plurality of fastener supports.

15. The wiring interconnection system according to claim 14, wherein the plurality of conductors are a first plurality of conductors of an incoming cable and the wiring system further includes an outgoing cable having a second plurality of conductors, the wiring interconnect system further comprising a housing adapted for mounting to a part of a building structure, said housing being adapted to receive end portions of the first and second pluralities of conductors, said plurality of fasteners being housed within said housing.

16. The wiring interconnection system according to claim 15, wherein the first plurality of conductors includes a first hot wire and a first neutral wire, the second plurality of conductors includes a second hot wire and a second neutral wire, at least one of said plurality of regions is provided with at least two of said plurality of fastener supports such that at the option of the user the wiring interconnection system can be used in one of a first configuration and a second configuration, exposed portions of both the first hot wire and the second hot wire are secured at least in part by one of said plurality of fasteners engaging a respective one of said two of said plurality of fastener supports and the exposed portions of both the first hot wire and the second hot wire in said first configuration, and wherein in said second configuration the exposed portion of the first hot wire is secured at least in part by a first one of said plurality of fasteners engaging a first one of said two of said plurality of fastener supports and the exposed portion of the first hot wire, and the exposed portion of the second hot wire is secured at least in part by a second one of said plurality of fasteners engaging a second one of said two of said plurality of fastener supports and the exposed portion of the second hot wire without conductive contact between the first and second hot wires.

17. The wiring interconnection system according to claim 16, wherein said base forms the bottom of said housing.

18. The wiring interconnection system according to claim 16, wherein all said plurality of fasteners are of said second type.

19. The wiring interconnection system according to claim 16, further comprising:

at least a second and third lengths of wire having, respectively, second and third terminals at an end thereof, each of said second and third terminals being adapted to engage a fastener of said second type; and a cover plate adapted for installation over said base, said cover plate having a plurality of knock outs each of which corresponds in location to a respective one of said plurality of fastener supports, said cover plate having indicia to indicate appropriate connections for said first, second, and third lengths of wire.

* * * * *

UNITED STATES PATENT AND TRADEMARK OFFICE
CERTIFICATE OF CORRECTION

PATENT NO.    : 6,527,598 B1                                              Page 1 of 1
DATED         : March 4, 2003
INVENTOR(S)   : George E. Opel It is certified that error appears in the above-identified patent and that said Letters Patent is hereby corrected as shown below:

Column 12,
Line 6, replace "%" with -- 1/4 --.

Signed and Sealed this

Fifth Day of August, 2003

JAMES E. ROGAN
*Director of the United States Patent and Trademark Office*